US008171814B2

(12) United States Patent
Martin et al.

(10) Patent No.: US 8,171,814 B2
(45) Date of Patent: May 8, 2012

(54) TRANSMISSION SYSTEM AND METHOD FOR PERFORMING A GEARSHIFT

(75) Inventors: William Wesley Martin, Milton Keynes (GB); Anthony Joseph Child, Milton Keynes (GB)

(73) Assignee: Zeroshift Limited, Milton Keynes (GB)

( * ) Notice: Subject to any disclaimer, the term of this patent is extended or adjusted under 35 U.S.C. 154(b) by 597 days.

(21) Appl. No.: 12/300,318

(22) PCT Filed: May 11, 2007

(86) PCT No.: PCT/GB2007/001747
§ 371 (c)(1),
(2), (4) Date: Nov. 10, 2008

(87) PCT Pub. No.: WO2007/132209
PCT Pub. Date: Nov. 22, 2007

(65) Prior Publication Data
US 2009/0227419 A1  Sep. 10, 2009

(30) Foreign Application Priority Data

May 11, 2006 (GB) .................................. 0609333.0
May 15, 2006 (WO) ................ PCT/GB2006/001798
Nov. 14, 2006 (GB) .................................. 0622667.4

(51) Int. Cl.
*F16H 3/12* (2006.01)
(52) U.S. Cl. ................. 74/342; 74/340; 74/369; 74/371
(58) Field of Classification Search .................... 74/335, 74/340, 342, 366, 369, 371
See application file for complete search history.

(56) References Cited

U.S. PATENT DOCUMENTS

| 3,263,781 | A | * | 8/1966 | Simpson ...................... 192/3.29 |
| 3,406,597 | A | * | 10/1968 | De Brie Perry et al. ......... 477/41 |
| 3,680,673 | A | * | 8/1972 | Webb .......................... 192/41 R |
| 3,872,737 | A | | 3/1975 | Thomas |
| 4,096,932 | A | | 6/1978 | Liberty, Jr. |
| 5,685,799 | A | | 11/1997 | Vukovich et al. |
| 5,827,148 | A | | 10/1998 | Seto et al. |
| 6,296,412 | B1 | * | 10/2001 | Bakker et al. ................... 403/24 |
| 6,609,056 | B1 | | 8/2003 | Czarnecki et al. |

(Continued)

FOREIGN PATENT DOCUMENTS
DE    199 39 334 A1    3/2001
(Continued)

OTHER PUBLICATIONS

International Search Report issued in connection with PCT Application No. PCT/GB2007/001747 filed May 11, 2008.

*Primary Examiner* — Ha D. Ho
(74) *Attorney, Agent, or Firm* — Knobbe Martens Olson & Bear, LLP

(57) ABSTRACT

A transmission system and method for operating the transmission system, where the transmission system includes a selector assembly arranged to select between gear ratios instantaneously without substantial power interruption. The selector assembly includes first and second sets of engagement members and an actuator system. The actuator system may have a first actuator member for moving the first set of engagement members, a second actuator member for moving the second set of engagement members, a first actuator device for actuating the first actuator member and a second actuator device for actuating the second actuator member independently of the first actuator device.

45 Claims, 11 Drawing Sheets

U.S. PATENT DOCUMENTS

| | | | |
|---|---|---|---|
| 2003/0084739 A1 | 5/2003 | Koerber et al. | |
| 2004/0009840 A1 | 1/2004 | Lutz et al. | |
| 2004/0077458 A1 | 4/2004 | Hartmann et al. | |
| 2006/0016282 A1 | 1/2006 | Berger et al. | |
| 2006/0047395 A1 | 3/2006 | Ikeya et al. | |

FOREIGN PATENT DOCUMENTS

| | | |
|---|---|---|
| DE | 101 57 943 A1 | 6/2003 |
| DE | 103 39 427 A1 | 3/2005 |
| EP | 0 677 684 A | 10/1995 |
| EP | 0 849 110 A | 6/1998 |
| EP | 1 072 821 A | 1/2001 |
| EP | 1 344 965 A | 9/2003 |
| EP | 1 439 087 A | 7/2004 |
| EP | 1 452 781 A | 9/2004 |
| EP | 1 471 291 A | 10/2004 |
| EP | 1 519 084 A | 3/2005 |
| EP | 1 564 446 A | 8/2005 |
| EP | 1 584 847 A | 10/2005 |
| GB | 2 225 819 A | 6/1990 |
| WO | WO 96/28317 A | 9/1996 |
| WO | WO 01/29440 | 4/2001 |
| WO | WO 02/057108 A | 7/2002 |
| WO | WO 2004/005769 A | 1/2004 |
| WO | WO 2004/099654 A | 11/2004 |
| WO | WO 2005/005869 A | 1/2005 |
| WO | WO 2005/026570 A | 3/2005 |
| WO | WO 2006/123128 | 11/2006 |

* cited by examiner

TRANSMISSION SYSTEM AND METHOD FOR PERFORMING A GEARSHIFT

RELATED APPLICATIONS

This application is the U.S. National Phase filing under 35 U.S.C. §371 of PCT/GB2007/001747, filed May 11, 2007, which designated the United States and was published in English, which claims priority under 35 U.S.C. §119(a)-(d) to Great Britain Patent Application No. 0609333.0, filed May 11, 2006, PCT/GB2006/01798, filed May 15, 2006, and to Great Britain Patent Application No. 0622667.4, filed Nov. 14, 2006. The contents of these applications is incorporated herein by reference in their entireties.

FIELD OF THE INVENTION

The present invention relates to transmission systems, in particular to instantaneous type transmission systems, drive systems including the transmission systems, methods for performing gearshifts and a transmission control unit arranged to control the transmission system and perform the gearshifts.

BACKGROUND OF THE INVENTION

Instantaneous transmission systems are arranged such that a new gear can be selected whilst the current gear is still engaged. When the new gear has been selected the initial gear is released. Thus during a shift, for at least one shift type, torque is substantially continuously supplied to the output of the transmission. Hence such shifts are said to be instantaneous because there is no delay in selecting the new gear whereas for conventional transmissions it is necessary to deselect the current gear, move through a neutral phase, and then select the new gear.

In some known instantaneous type transmission systems, such as those described in WO 2004/099654. WO 2005/005868, WO 2005/005869, WO 2005/024261 and WO 2005/026570 shift conflicts and shift control problems can occur under certain circumstances that can lead to failure of the transmission.

The known transmissions mentioned above have a plurality of gear trains for transmitting drive between transmission input and output shafts. For a first gear train, a first gear wheel is rotatably mounted on either a transmission input shaft or an output shaft and a second gear wheel is fixed to the other shaft, in mesh with the first gear wheel. A second gear train comprising third and fourth gear wheels is similarly arranged. The transmission also includes at least one gear selector mechanism that is located between the rotatably mounted gear wheels that is arranged to selectively lock them for rotation with the shaft on which they are mounted. When a gear wheel from a gear train is locked for rotation with the shaft, drive is transmitted between the input and output shafts via that gear train.

The arrangement of the transmission is such that when drive is transmitted between the input and output shafts via one of the gear trains the gear selector mechanism can select a new gear train under power without first disengaging the first gear train, by locking the rotatably mounted gear wheel of the second gear train to its shaft. Thus momentarily, drive is transmitted between the input and output shaft via two gear trains simultaneously. The new gear train then overdrives the first gear train and the selector mechanism disengages the first gear wheel. Drive is then transmitted between the input and output shafts via the new gear train only. Since it is not necessary to open the clutch when changing gear the transmission provides uninterrupted power through a gearshift.

An instantaneous gear selector mechanism typically has four modes of operation with respect to each of the rotatably mounted gear wheels associated with it:
  Fully engaged in both torque directions (fully in gear);
  Disengaged in both torque directions (neutral);
  Engaged in the forward torque direction while disengaged in the reverse torque direction;
  Disengaged in the forward toque direction while engaged in the reverse torque direction.

The last two modes enable a discrete ratio gearbox to have the ability to shift up or down ratios instantly under load without torque interruption. In some embodiments it is not necessary to have a neutral position.

However, there is an inherent failure mode in known transmissions including a plurality of selector assemblies and having the last two modes of operation where it is necessary to operate both selector assemblies in order to select a new gear. That is, it is possible for two gears to be engaged simultaneously with opposing torque directions under some conditions, which can cause the transmission to lock up or the engagement members to ramp out, depending on the type of shift.

For example, a transmission system typically includes at least three gear trains, and is likely to include four to six gear trains. A transmission having four gear trains and a conventional layout with all the selector mechanisms mounted on the same shaft, typically requires two instantaneous gear selector mechanisms. The first gear selector mechanism is arranged to selectively engage the first and second gear trains and the second gear selector mechanism is arranged to selectively engage the third and fourth gear trains. Each gear selector mechanism includes first and second sets of engagement members having opposed ends with fixed opposed directions of torque transfer. This provides an inherent fail-safe arrangement against the above mentioned failure mode where the shift is from a gear on one side of the selector mechanism to a gear on the other side of the same selector mechanism, for example when the first selector mechanism selects between the first and second gears or when the second selector mechanism selects between the third and fourth gears.

The failure mode described above can only occur if a gearshift is from a gear that is engageable by one of the gear selector mechanisms to a gear that is engageable by the other gear selector mechanism, for example when changing between second and third gears in the four speed transmission mentioned above, since this requires movement of both the first and second gear selector mechanisms.

Most of the known instantaneous gear selector mechanisms include an actuator assembly for controlling operation of the engagement members that includes a so called "dual fork" arrangement. That is both sets of engagement members are controlled by a single fork having a first part for controlling the movement of the first set and a second part (dual) for controlling the movement of the second set of members. Thus a single actuation affects the movement/operation of both sets of engagement members while allowing some independent movement of the first and second sets of engagement members. For example, a single actuation may cause one set to be moved out of engagement with a gear wheel whilst the other set remains engaged with the gear wheel. The inventors have found that this arrangement can be a significant cause of gear selection conflicts that occur when selecting a new gear requires movement of more than one gear selector mechanism.

WO 2006/123128 addresses this problem by having a transmission system including a blocking mechanism to prevent certain conflict shifts occurring, however the system disclosed adds significant weight and inertia to the transmission.

The transmission system disclosed in WO 2005/026570 can theoretically be used to address the problem however in practice electromagnetically actuated gear selector mechanisms are very difficult to implement since there are difficulties in controlling operation of the magnetic fields in order to obtain the degree of control required for the reliable engagement and disengagement for a successful gearshift. Furthermore, the range of gearshift types required for a working transmission system go beyond the control abilities of this type of transmission.

Another problem with the "dual fork" type of instantaneous gear selector mechanisms described in WO 2004/099654, WO 2005/005868, WO 2005/005869 and WO 2005/024261 is that when a transmission operates at low speeds the biasing force that is applied to the drivingly engaged set of engagement members by the actuator via the disc spring during a shift may be greater than the frictional force between the engagement members and the dogs. If this arises, the engagement members can accidentally disengage from the current gear wheel before the new gear wheel is engaged, leading to a loss of drive. This is unacceptable for automotive applications.

A further problem with the known instantaneous systems is that when performing kick-down shifts (accelerating down shifts) in a vehicle, there is a tendency for the vehicle to lurch when the new gear is engaged. This leads to a very uncomfortable ride for the occupants of the vehicle. A further problem arises with kick-down shifts because the newly engaged gear wheel cannot overdrive the former gear wheel due to the differences in gear wheel geometry. When addressing this problem, previous systems used the approach of fully disengaging the current gear train before engaging the new gear train. However with this approach there is a substantial interruption in power transfer that is detectable by the driver and so the method is not optimised. Therefore a method of performing a kick-down shift without substantial power interruption (that is without a power interruption that is noticeable by the driver of a vehicle) is highly desirable. This is a very important problem to be solved for instantaneous transmission systems since it is necessary to be able to perform kick-down shifts in an acceptable manner in order for this type of transmission system to be suitable for road vehicles.

Accordingly the present invention seeks to provide a transmission system, a drive system, a transmission control system and gear selection methods, that mitigate at least one of the aforementioned problems.

SUMMARY OF THE INVENTION

According to one aspect of the present invention there is provided a transmission system including a selector assembly arranged to select between gear ratios instantaneously without substantial torque interruption, said selector assembly including first and second sets of engagement members and an actuator system having a first actuator member for moving the first set of engagement members, a second actuator member for moving the second set of engagement members, a first actuator device for actuating the first actuator member and a second actuator device for actuating the second actuator member independently of the first actuator device.

According to another aspect of the invention there is provided a transmission system including a first shaft, a first gear element rotatably mounted on the first shaft, a first gear selector assembly including first and second sets of engagement members, arranged to selectively lock the first gear wheel for rotation with the first shaft, said selection being from operational modes that include: lock the first gear element for rotation with the first shaft in the clockwise and anti-clockwise directions; lock the first gear element for rotation with the first shaft in the clockwise direction and not lock in the anti-clockwise direction; lock the first gear element for rotation with the first shaft in the anti-clockwise direction and not lock in the clockwise direction; and further including an actuator system for selecting between the operational modes having a first actuator member for moving the first set of engagement members, a second actuator member for moving the second set of engagement members, a first actuator device for actuating the first actuator member and a second actuator device for actuating the second actuator member independently of the first actuator device.

Having separate actuators for each set of engagement members ensures that operation of the first and second sets of engagement members is not interdependent, which allows their movement to be independently controlled. This enables the transmission to be controlled in such away as to prevent accidental disengagement of the engagement members during shifts at low speeds and to prevent lockup occurring by preventing gear elements from being locked for rotation with the first shaft in opposed directions. This overcomes the problems associated with WO 2004/099654, WO 2005/005868, WO 2005/005869 WO 2005/024261 and WO 2005/026570. Preferably the second gear selector assembly is similar to the first gear selector assembly.

The first gear selector assembly can be arranged to select the following operational mode: not lock the gear element for rotation with the first shaft in the clockwise or anticlockwise directions. Thus the gear element can be fully disengaged.

Advantageously at least one of the first and second actuator devices is electronically controllable and can be either electrically driven, mechanically driven, pneumatically driven or hydraulically driven.

Advantageously at least one of the first and second actuator members can be slidably mounted on a support and the or each actuator device is arranged to drive its respective actuator member along the support bi-directionally. Preferably the actuator system includes resilient means for biasing the first and/or second set of engagement members in an axial direction. The resilient means are arranged to bias movement of the engagement members towards the unengaged gear element.

Advantageously the transmission system may include a second gear element rotatably mounted on the first shaft and a second gear selector assembly for selectively locking the second gear element for rotation with the first shaft. The second gear selector assembly can be arranged to lock the second gear element for rotation with the first shaft, said selection being from operational modes that include: lock the gear element for rotation with the first shaft in the clockwise and anti-clockwise directions; lock the gear element for rotation with the first shaft in the clockwise direction and not lock in the anti-clockwise direction; lock the gear element for rotation with the first shaft in the anti-clockwise direction and not lock in the clockwise direction.

The second gear selector assembly can select the following operational mode: not lock the second gear element for rotation with the first shaft in the clockwise or anticlockwise directions.

The second gear selector assembly includes first and second sets of engagement members arranged to selectively lock the second gear wheel for rotation with the first shaft and an actuator system for selecting between the operational modes having a first actuator member for moving the first set of engagement members, a second actuator member for moving the second set of engagement members, a first actuator device for actuating the first actuator member and a second actuator device for actuating the second actuator member independently of the first actuator device.

Advantageously the or each gear selector assembly is arranged such that when a driving force is transmitted, one of the first and second sets of engagement members drivingly engages the engaged gear element, and the other set of engagement members is then in an unloaded condition.

Preferably the or each selector assembly is arranged such that when a decelerating force is transmitted the first set of engagement members engages the engaged gear element, and the second set of engagement members is in an unloaded condition, and when a driving force is transmitted the second set of engagement members drivingly engages the engaged gear element, and the first set of engagement members is then in an unloaded condition.

Advantageously the actuator system can be arranged to bias the loaded set of engagement members towards an unengaged gear wheel without disengaging the loaded set of engagement members from the engaged gear wheel.

Advantageously the transmission includes an electronically programmable control system for controlling operation of the or each gear selector assembly. For example, the control system may include a processing device that is programmed to control operation of the selector assemblies. This can prevent transmission lock up occurring by appropriate sequence control.

The control system can be arranged to move the unloaded set of engagement members out of engagement from the engaged gear element before actuating the other gear selector assembly to engage the new gear wheel. This is an important factor in preventing transmission lock up when torque reversals occur during a shift requiring the operation of more than one selector assembly since it removes the set of engagement elements out of engagement with the current gear wheel that would otherwise lock the transmission if a torque reversal occurred.

The control system can also be arranged to bias the loaded set of engagement members towards the unengaged gear wheel until the loaded set of engagement members are free to move.

Advantageously the transmission system includes means for determining the direction of torque in the transmission system when receiving a request for a gearshift. Preferably the transmission includes a sensor device, such as a speed sensor for detecting the rotational speed of at least one transmission component or transmission input, and the control system determines from the sensor device the rate of change of rotational speed. This enables the sensor device to determine the direction of torque in the transmission, that is whether there is an accelerating or braking force being applied.

The transmission may also include means for preventing the direction of torque in the transmission changing during a gearshift.

Advantageously the control system is arranged to issue control signals to adjust the output of a drive source. Preferably the control system is connected to an engine control unit via a communication means such as a Controller Area Network (CAN) bus. The control signals instruct the engine control unit to adjust the engine output as required. The control system can also be arranged to issue control signals for controlling the clamp load between input and output sides of a clutch device. Preferably the control system controls the operation of a clutch actuator, which in turn controls the clutch device. Controlling both the clutch and the engine control system provides the best gear shift results.

Advantageously the transmission includes means for performing a checking routine before undertaking a gearshift to determine whether the conditions for making the shift are suitable. Preferably the control system is arranged to perform this function.

Advantageously the transmission includes means for postponing the gearshift when the means for performing a checking routine determines that conditions for the shift are not suitable. Preferably this is undertaken by the control system.

Advantageously the transmission includes means for determining which gear(s) is/are engaged. Preferably this is achieved by means for detecting the positions of the first and second sets of engagement members for each gear selector assembly. The control system is arranged to determine which gear element(s) is/are engaged from the output of the means for detecting the positions of the first and second sets of engagement members.

The transmission may include a third gear element rotatably mounted on the first shaft and wherein the transmission system is arranged to selectively lock the third gear element for rotation with the first shaft, said selection being from operational modes that include: lock the gear element for rotation with the first shaft in the clockwise and anti-clockwise directions; lock the gear element for rotation with the first shaft in the clockwise direction and not lock in the anti-clockwise direction; and lock the gear element for rotation with the first shaft in the anti-clockwise direction and not lock in the clockwise direction. Preferably the third gear element is locked for rotation with the first shaft by the first selector assembly, however a separate assembly can be used.

The transmission system can select the following operational mode with respect to the third gear element: not lock the gear element for rotation with the first shaft in the clockwise or anticlockwise directions.

The first gear selector assembly is preferably arranged to engage the third gear element by moving the unloaded set of engagement members out of engagement with the first gear element and into driving engagement with the third gear element whilst the first gear element is still engaged by the loaded set of engagement members to effect a gear change between the first and third gear elements. Thus the first gear selector assembly is arranged to selectively lock the first and third gear elements for rotation with the first shaft simultaneously, at least momentarily. Typically, this is only happens for a very short period of time during the shift, since when the new gear has been to selected the loaded element set becomes unloaded and the control system is arranged to disengage it from it gear element and move it into engagement with the new gear element.

The first gear selector assembly is preferably arranged to move the unloaded set of engagement members out of engagement with the third gear element and into driving engagement with the first gear element whilst the third gear element is still engaged by the loaded set of engagement members to effect a gear change between the first and third gear elements.

Any practicable number of gear selector assemblies can be included in the system. Preferably the transmission includes at least three gear selector assemblies, which are similar to the first gear selector assembly. Typically, each gear selector assembly will selectively lock two gear elements for rotation with a shaft. Typically, each rotatably mounted gear element will form part of a gear train that transfers drive between the first shaft and a second shaft. Preferably transmissions include between three and thirty gear trains, and more preferably between four and twenty one gear trains, and more preferably still between four and eight gear trains. The number of gear trains required depends on the application. For example, cars typically include four to six gear trains and lorries may have twenty one gear trains. The first gear element can be part of a first gear train that includes a fourth gear wheel fixed to the second shaft. The second gear element can be part of a second gear train that includes a fifth gear wheel fixed to the second shaft and the third gear element can be part of a third gear train that includes a sixth gear wheel fixed to the second shaft.

According to another aspect of the invention there is provided a transmission system including first and second rotatable shafts, and means for transferring drive from one of the shafts to the other shaft including first and second gear elements each rotatably mounted on the first shaft and having drive formations formed thereon, a gear selector assembly for selectively transmitting torque between the first shaft and the first gear element and between the first shaft and the second gear element, said selector assembly including first and second sets of engagement members that are moveable into and out of engagement from the first and second gear elements and an actuator system, wherein the gear selector assembly is arranged such that when a driving force is transmitted, one of the first and second sets of engagement members drivingly engages the engaged gear element, and the other set of engagement members is then in an unloaded condition, and the actuator system includes a first actuator member for moving the first set of engagement members, a second actuator member for moving the second set of engagement members, a first actuator device for actuating the first actuator member and a second actuator device for actuating the second actuator member independently of the first actuator device, and wherein the actuator system is arranged to move the unloaded set of engagement members into driving engagement with the unengaged gear element to effect a gear change.

Advantageously the first and second sets of engagement members are arranged to rotate, in use, with the first shaft. Preferably the first shaft is an input shaft and the second shaft is an output shaft and drive is transferred from the input shaft to the output shaft. Preferably the selector assembly is arranged such that when the first and second sets of engagement members engage one of the first and second gear elements the backlash when moving between acceleration and deceleration is less than or equal to four degrees.

Preferably the drive formations on the first and second gear elements comprise first and second groups of dogs respectively. For example, the first and second groups of dogs each comprise between two and twelve dogs, evenly distributed on the first and second gears respectively. Preferably the first and second groups of dogs each comprise between two and four dogs, and more preferably three dogs.

The first and second sets of engagement members preferably comprise between two and eight members, more preferably between two and four members, and more preferably still three members.

Advantageously the first shaft may include keyways arranged such that the first and second sets of engagement members can slide axially along the keyways and to radially restrain the positions of the sets of engagement members. Preferably the cross-section of the keyways is one of T-shaped, slotted, and dovetailed.

Preferably the actuator assembly includes at least one resilient means arranged to move at least one of the first and second sets of engagement members into engagement with the first and second gear elements when the engagement members are in unloaded conditions. Preferably the or each resilient means is arranged to bias at least one of the first and second sets of engagement members towards the first or second gear element when the engagement members are drivingly engaged with a gear element.

The transmission system may further include third and fourth gears mounted on the first shaft and a second selector assembly to provide additional gear ratios between the first and second shafts.

According to another aspect of the invention there is provided a drive system including a drive source and a transmission system having any one of the combination of features described above.

The drive system preferably includes a drive source control system for monitoring the operational condition of the drive source and automatically adjusting the output of the drive source independently of the driver of the drive source in some operational conditions. For example, the control system is arranged to adjust the output speed/torque of an engine.

The drive system also includes clutch means for adjusting the torque transmitted from the drive source to the transmission and means for detecting relative rotational movement between the input and output sides of the clutch means. This enables the control system to reduce the clamp load between the input and output sides of the clutch in order to enable it to slip before selecting a new gear such that torque spikes generated by the transmission when a new gear is selected are at least partially absorbed by further relative rotational movement of the input and output sides of the clutch device.

Advantageously the transmission includes means for detecting the direction of torque in the transmission. For example, the transmission control system can be arranged to determine the direction of torque in the transmission by comparing the output of the means for detecting relative rotational movement between the input and output sides of the clutch means. Alternatively, or additionally, the means for detecting the direction of torque in the transmission may include at least one of a vehicle acceleration sensor, a sensor for detecting strain in at least one transmission component and a sensor for determining the rate of change in velocity in a rotating transmission component.

Advantageously the control system is arranged to adjust the output of the drive source and/or the clutch device to ensure that the torque in the transmission system does not change direction during a gearshift. For example, by increasing, decreasing and/or holding the engine speed as appropriate and/or increasing, decreasing and/or holding the clutch clamp load as appropriate.

According to another aspect of the invention there is provided a method for performing a gearshift in a transmission system having first and second gear elements rotatably mounted on a first shaft, a first gear selector assembly for selectively locking the first gear wheel for rotation with the first shaft and a second gear selector assembly for selectively locking the second gear wheel for rotation with the first shaft, wherein each gear selector assembly includes first and second sets of engagement members and an actuator system for actuating the first and second sets of engagement members for locking its respective gear wheel for rotation the first shaft, said selection being from operational modes that include: lock the gear element for rotation with the first shaft in the clockwise and anti-clockwise directions; lock the gear element for rotation with the first shaft in the clockwise direction and not lock in the anti-clockwise direction; lock the gear element for rotation with the first shaft in the anti-clockwise direction and not lock in the clockwise direction, and a control system for controlling operation of the transmission system, including disengaging the unloaded set of engagement members from the currently engaged gear element prior to selecting the new gear element with the other gear selector assembly.

This method prevents lockup occurring for shifts that involve first and second gear selector assemblies since it ensures that selector assemblies do not lock the gear elements for rotation with the first shaft in opposed directions. So even if there is a torque reversal during a shift, which is a very dangerous scenario, the transmission will not lock up.

For example, if the first gear wheel is locked for rotation in the acceleration and deceleration directions (fully engaged) with the second set of engagement members drivingly engaging the first gear element, then the first set is in an unloaded condition. Before the second gear selector assembly engages the second gear element, the first actuator moves the first set of engagement members out of engagement with the first gear element. Thus the first gear element is no longer fully engaged but is locked for rotation in one of the acceleration and deceleration directions only and is unlocked in the other direction. The second selector assembly then selects the second gear element with the complementary set of engagement members (acceleration or deceleration direction to match the direction of torque) whilst the first gear element is still engaged by the first gear selector assembly, and thus performs an instantaneous gearshift. If a torque reversal occurs during the shift, the transmission does not lock up since both gear elements are locked for rotation in the same direction and are unlocked in the other direction.

The inventors have discovered that this aspect of the invention can be used with some embodiments of instantaneous transmissions having only one actuator to control both the first and second sets of engagement members or separate actuators for each set of engagement members. For example, this aspect of the invention is applicable to some embodiments of the type of instantaneous transmission systems described in WO 2004/099654, WO 2005/005868, WO 2005/005869, WO 2005/024261, the contents of which are incorporated by reference.

When starting from a position wherein the first gear element is locked for rotation with the first shaft in the acceleration and deceleration directions, the method includes disengaging the unloaded set of engagement members from the first gear element and selecting the second gear element with the corresponding set of engagement members. When performing an accelerating upshift, the method includes moving the deceleration engagement member set out of engagement from the first gear element before the second gear selector assembly engages the second gear element with its acceleration engagement member set. When performing a decelerating upshift, the method includes moving the acceleration engagement member set out of engagement from the first gear element before the second gear selector assembly engages the second gear element with its deceleration engagement member set.

When starting from a position wherein the second gear element is locked for rotation with the first shaft in the acceleration and deceleration directions, the method includes disengaging the unloaded set of engagement members from the second gear element and selecting the first gear element with the corresponding set of engagement members. When performing an accelerating downshift, the method includes moving the deceleration engagement member set out of engagement from the second gear element before the first gear selector assembly engages the first gear element with its acceleration engagement member set. When performing a decelerating downshift, the method includes moving the acceleration engagement member set out of engagement from the second gear element before the first gear selector assembly engages the first to gear element with its deceleration engagement member set.

Advantageously the method includes determining the direction of torque in the transmission in order to identify which set of engagement members to move out of engagement from the engaged gear element. Preferably this includes measuring at least one transmission parameter and the control system determining the direction of torque in the transmission from the measured parameter. For example, it may include monitoring the rotational speed of at least one transmission component and determining the direction of torque by calculating the rate of change of rotational speed.

Advantageously the method includes determining which gear is currently engaged. Preferably this includes determining the operational condition of each selector assembly in order to determine which gear is currently engaged. This may include determining the positions of the first and second sets of engagement members for each selector assembly in order to determine which gear is currently engaged.

Advantageously the method includes reducing the clutch clamp load in a clutch device until there is relative movement between the input and output sides of the clutch device before engaging the new gear element. Reducing the clutch clamp load to the slip point without opening the clutch is to allow further relative rotational movement between input and output sides of the clutch device if the torque exceeds a predetermined value when the unengaged gear ratio is engaged by a gear selector assembly. Thus any torque spikes that occur due to the impact when selecting a new gear element are at least partially absorbed.

Advantageously the method includes determining whether there is relative movement between the input and output sides of the clutch. Preferably this includes monitoring the rotational speed of at least one of input and output sides of the clutch device, and most preferably both sides of the clutch. Advantageously the method includes adjusting the clamp load between the clutch plates in order to maintain a slip condition.

Advantageously the method includes adjusting the drive source speed to synchronise it with the new gear speed before engaging the new gear element.

Advantageously the method includes adjusting the torque applied to the transmission to ensure that torque in the transmission system does not change direction during a gearshift. Preferably this z) includes adjusting the drive source speed and/or the clutch clamp load in order to ensure that torque in the transmission system does not change direction during a gearshift.

The method also includes reinstating clutch clamp load and returning control of the engine to the user after the gearshift has been completed.

Advantageously the method includes performing a checking routine in order to determine whether the gearshift can be made without the transmission locking up. Advantageously the method may include postponing the gearshift if the checking routine indicates that it is not safe to perform the gearshift. For example, the control system can abort the gearshift or postpone it for a predetermined amount of time, say 10 to 100 ms, and then perform the gearshift, or alternatively can perform at least one further check to determine whether the conditions have changed to enable a safe gearshift, and only performing the gearshift when the conditions are suitable. Preferably the control system continuously monitors the checked parameters during a gear shift.

The actuator system for each gear selector mechanism includes a first actuator for actuating the first set of engagement members and a second actuator for actuating the second set of engagement members independently of the first set.

Advantageously the method includes measuring the rotational speed of a transmission output member.

According to another aspect of the invention there is provided a method for performing a gearshift in an instantaneous transmission system including performing a checking routine to ensure that the operating conditions are suitable for the requested gearshift to take place, and if not, aborting the gearshift.

This is an alternative method for preventing the transmission from locking up since the control system will only allow gearshifts to take place when the conditions for a safe shift are detected by the control system. This method can be used independently or in conjunction with the method described above.

Advantageously the method includes checking the direction of torque before initiating the to gearshift. The method may also include determining the positions of the sets of engagement members prior to making the shift.

According to another aspect there is provided a method for performing a gearshift in an instantaneous transmission system including controlling the torque input to the transmission system in order to ensure that the direction of torque does not change during the gearshift. The inventors have discovered that one of the most dangerous scenarios is if the direction of torque changes during a shift. If torque has a constant known direction during a shift, the natural sequence of events prevents the above failure mode. During a sudden reversal of the direction of torque immediately prior to, or during a shift, there is potential for the above failure mode to occur.

This is an alternative method for preventing the transmission from locking up since the control system prevents the possibility of the direction of torque changing in the transmission during a gearshift. This method can be used independently or in conjunction with either of the methods described above.

Advantageously the method includes adjusting the engine speed and/or the clutch clamp load in order to ensure that torque in the transmission system does not change direction during a gearshift.

According to another aspect there is provided a method for performing an accelerating downshift (kickdown shift) in an instantaneous transmission system having first and second gear trains and a control system for controlling operation of the transmission system, including automatically reducing the clutch clamp load in a clutch device until there is relative movement between the input and output sides of the clutch device and automatically adjusting the output of a drive source to substantially synchronise it with the new gear train to be engaged before engaging the new gear train and while the current gear train is still engaged.

This helps to smooth the gearshift by reducing the magnitude of torque spikes in the transmission since the engine is synchronised to the new gear ratio and the clutch device is in the slip condition, which enables further relative movement between the input and output sides of the clutch device due to the shock of engaging the new gear element.

Advantageously the method can include engaging the new gear train while the current gear train is still engaged for shifts requiring the movement of two selector assemblies.

Advantageously the method can include disengaging a loaded set of engagement members from the current gear train before engaging the new gear train for shifts requiring the movement of only one selector assembly.

Preferably the transmission system includes first and second gear elements rotatably mounted on a first shaft, a gear selector system for selectively locking the first and second gear elements for rotation with the first shaft, said selection being from operational modes that include: lock the gear element for rotation with the first shaft in the clockwise and anti-clockwise directions; lock the gear element for rotation with the first shaft in the clockwise direction and not lock in an anti-clockwise direction; lock the gear element for rotation with the first shaft in the anti-clockwise direction and not lock in the clockwise direction.

Advantageously interrupting or reducing the torque in the transmission can be achieved by adjusting the output of the drive source, for example by briefly cutting the energy/fuel supply to the drive source via a drive source control system. Alternatively, or additionally, interrupting or reducing the torque in the transmission can be achieved by adjusting the operational condition of a clutch device. For example, the clamp load between the input and output sides of the clutch can be adjusted using a clutch actuator. Preferably the clutch device is opened momentarily in order to interrupt torque.

Advantageously the selector system includes a first gear selector assembly that is arranged to lock at least the first gear element for rotation with the first shaft. In some embodiments, the first gear selector assembly is arranged to lock the first and second gear elements for rotation with the first shaft. Preferably the selector system includes a second gear selector assembly arranged to lock the second gear element for rotation with the first shaft.

Preferably a third gear element is rotatably mounted on the first shaft. Preferably the first selector assembly, or a third selector assembly, is arranged to selectively lock the third gear element with the first shaft, said selection being from operational modes that include: lock the gear element for rotation with the first shaft in the clockwise and anti-clockwise directions; lock the gear element for rotation with the first shaft in the clockwise direction and not lock in the anti-clockwise direction; lock the gear element for rotation with the first shaft in the anti-clockwise direction and not lock in the clockwise direction.

According to another aspect of the invention there is provided a method for performing an accelerating downshift (kickdown shift) in a transmission system having first and second gear elements rotatably mounted on a first shaft, a gear selector system for selectively locking the first and second gear elements for rotation with the first shaft, said selection being from operational modes that include: lock the gear element for rotation with the first shaft in the clockwise and anti-clockwise directions; lock the gear element for rotation with the first shaft in the clockwise direction and not lock in an anti-clockwise direction; lock the gear element for rotation with the first shaft in the anti-clockwise direction and not lock in the clockwise direction, including selecting a new gear element while the current gear element is engaged and briefly interrupting or reducing torque in the transmission in order to fully disengage the current gear element.

According to another aspect there is provided a transmission control unit programmed to control operation of an instantaneous transmission system according to at least one of the configurations described above and/or to perform at least one of the methods described above.

An embodiment of the present invention will now be described, by way of example only, with reference to the accompanying drawings in which like references indicate equivalent features, wherein:

DETAILED DESCRIPTION OF THE PREFERRED EMBODIMENT

Figure 1A:
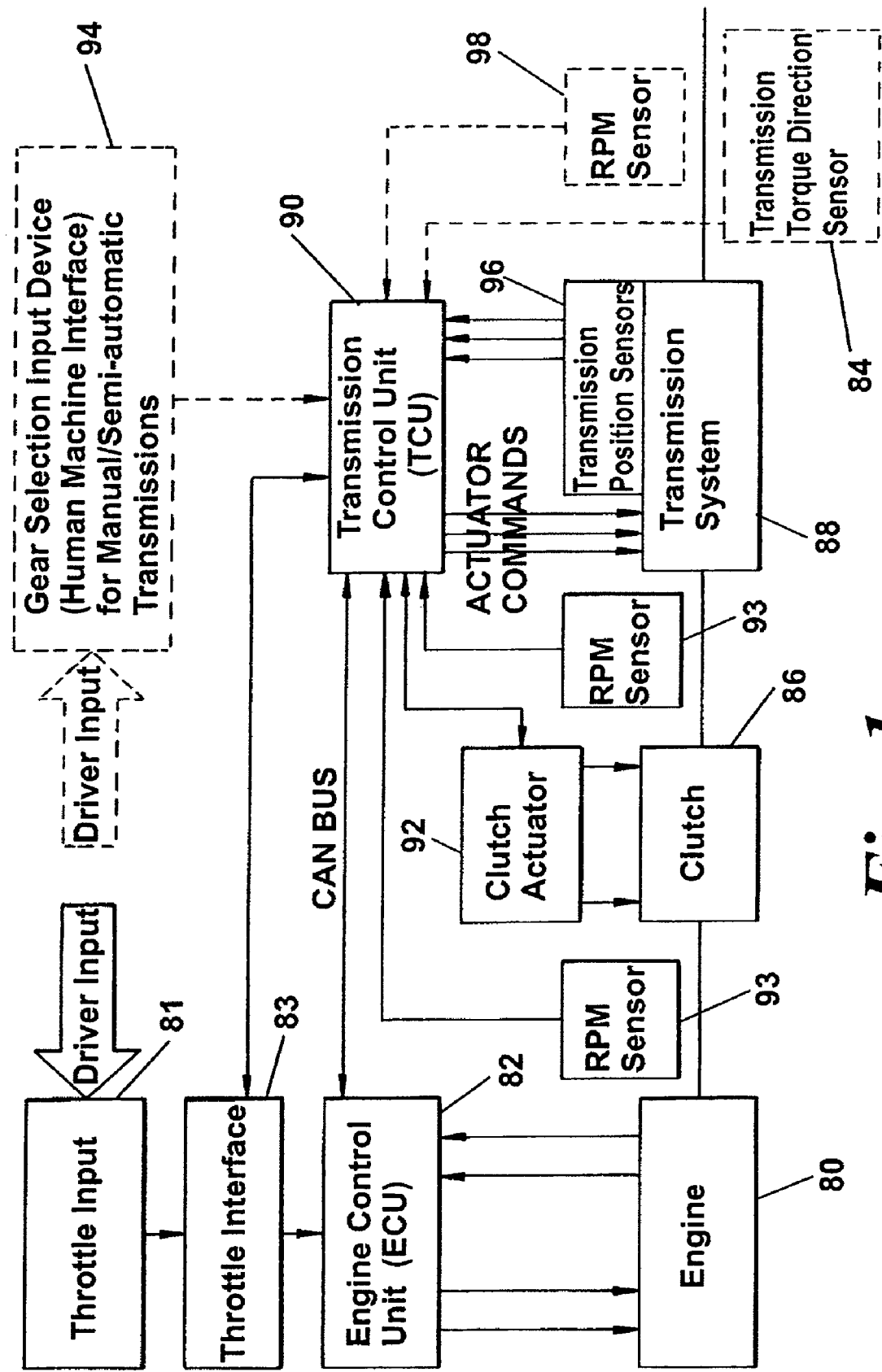
FIG. 1a is a schematic of a vehicle drive system including a transmission system in accordance with the present invention.

FIG. 1a is a schematic diagram of a drive system in accordance with the current invention. The drive system can be used in, for example, vehicles such as motorcars and lorries, and includes an engine 80, an engine control unit 82, a sensor system 84 for determining the direction of torque in the transmission, a clutch device 86 such as a friction clutch, a transmission system 88, and a transmission control unit 90.

The engine 80 is typically an internal combustion engine in a vehicle but may be an electric motor for electric vehicles or any other suitable drive source. The output of the engine 82 is largely determined by the driver loading a throttle input device 81 (typically a throttle pedal), which is connected to the engine via a throttle interface 83 and the engine control unit 82. The engine control unit 82 is arranged to monitor and adjust the output of the engine 80 in accordance with instructions received from the user and the transmission control unit 90. The engine control unit 82 may be a throttle potentiometer type system or alternatively an electronic control system (sometimes called a "drive by wire" system).

The engine control unit 82 communicates with the transmission control unit 90 via a Controller Area Network (CAN) bus.

The transmission control unit 90 is a software driven automatic control system that is programmed to produce smooth gearshifts and prevent certain transmission failure modes occurring, for example transmission lockup due to impermissible gearshifts. In order to fulfill its primary functions the transmission control unit 90 controls the sequencing of shift operations in the transmission system 88, the torque in the transmission system via the clutch 88 and engine 80 using a clutch actuator 92 and the engine control unit 82 respectively. In order to achieve this, the transmission control unit 90 receives inputs to determine the direction of torque in the transmission. This can be calculated from existing vehicle sensors for detecting engine and road speeds and from a knowledge of the geometry of the transmission system or can be from clutch sensors 93 or a transmission torque direction sensor 84. The transmission control unit 90 also determines the operational conditions of selector assemblies 29,31,33, for example by determining their positions from a knowledge of the transmission system and controlling actuation of the selector assemblies 29,31,33 and/or by using one or more transmission position sensors 96. Optionally, the transmission control unit 90 can also receive inputs from one or more of the following devices: a transmission output shaft speed sensor 98, and a user operated gear selection input device 94 for manual and semi-automatic transmissions.

The torque value in the transmission is determined in part by the output of the engine 80 and in part by the operational condition of the clutch 86, which determines the maximum permissible torque that can be transmitted to the transmission (clutch torque limit) according to the clamp load between the input and output sides of the clutch. The clamp load between the input and output sides of the clutch is determined by the transmission control unit 90 via the clutch actuator 92. Reducing the clamp load between the clutch plates allows relative rotational movement (slip) between the input and output sides of the clutch device 86 to limit the value of torque transmitted.

The input and output clutch sensors 93 detect the speeds of the input and output sides of the clutch 86 respectively. The readings from the sensors 93 are monitored by the transmission control unit 90, which determines whether slip is occurring and the direction of torque according to the values received from the sensors 93. The transmission control unit 90 is arranged to control the clutch actuator 92 and select the clutch clamp load in order to transmit the desired amount of torque to the transmission 88.

The drive system may include one or more clutch clamp load sensors (not shown) in order to detect slip between the input and output sides of the clutch 86.

The optional sensor system 84 for determining the direction of torque in the transmission, may include an accelerometer for determining whether the vehicle is accelerating or decelerating such as a mercury switch, a pair of load cells arranged to detect strain in transmission components wherein from a comparison of the outputs of each load cell it is possible to determine the torque direction (see WO 2005/005869), a sensor for detecting throttle position and/or a sensor for determining the rate of change in velocity in a rotating transmission component, such as an output shaft. In each case, it is the transmission control unit 90 that determines the direction of torque based on signals received from the sensor(s) used.

Any other suitable way of determining the direction of torque in the transmission can be used.

Optionally, the system can include a speed sensor 98 for detecting the output speed of the transmission. This can assist the transmission control unit 90 to determine which gear is engaged, since it can be programmed with details of the gear ratios and knows the input speed from the output side of the clutch sensor 93. Also, the readings from the speed sensor 98 can be used by the transmission control unit 90 to take into account the effect of changing road conditions on the direction of torque in the transmission 88.

Figure 1B:
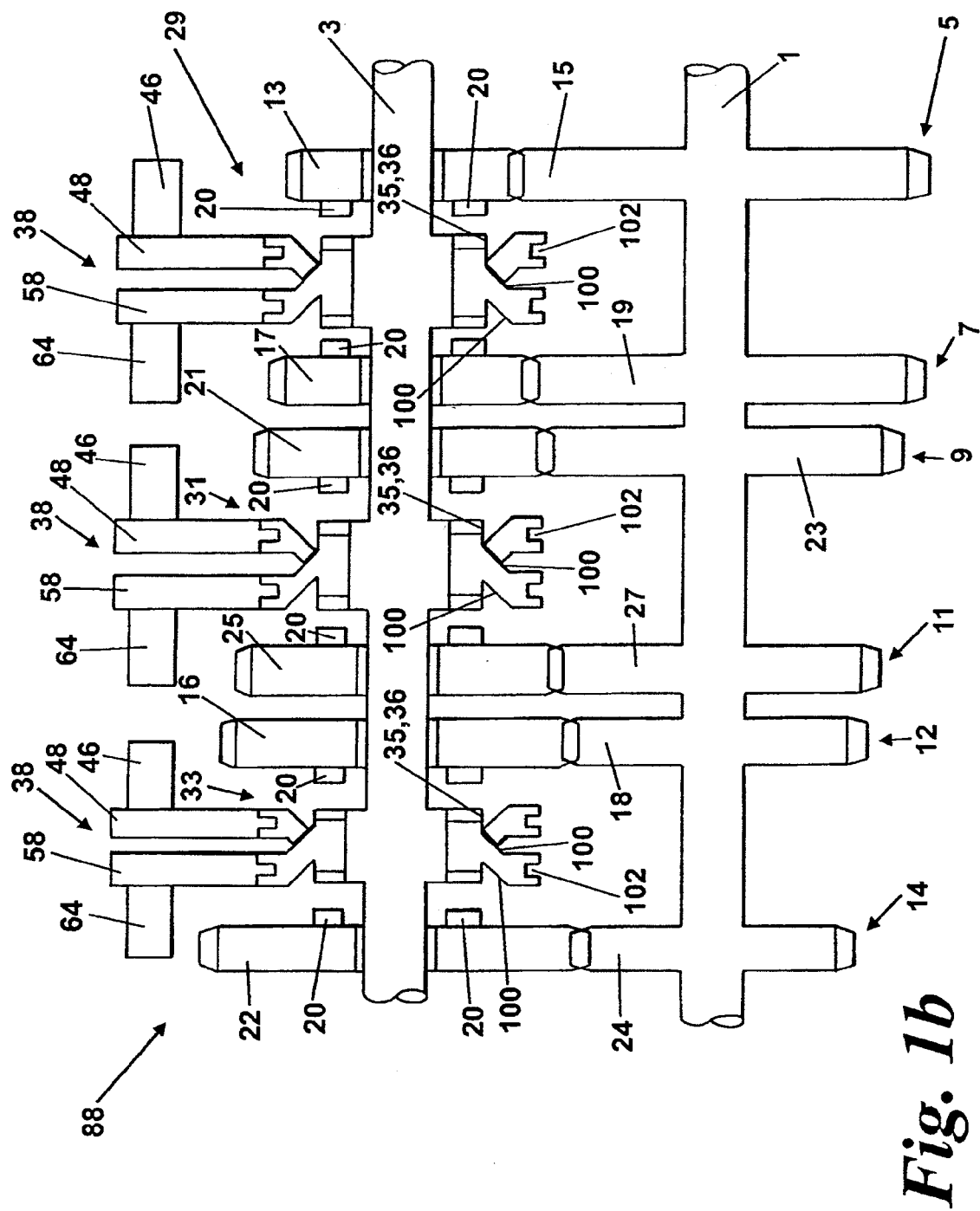
FIG. 1b is a sectional view of a general arrangement of a transmission system in accordance with the present invention.

FIG. 1b shows the layout of the transmission system 88, which includes an output shaft 1, an input shaft 3 and first, second, third, fourth, fifth and sixth gear trains (or gear ratios) 5, 7, 9, 11, 12, 14 ($1^{st}$, $2^{nd}$, $3^{rd}$, $4^{th}$, $5^{th}$ and $6^{th}$) arranged to transmit drive between the input and output shafts 3, 1. The first gear train 5 comprises a first gear wheel 13 rotatably mounted on the input shaft 3 via a bearing and a second gear wheel 15 fixed to the output shaft 1 in mesh with the first gear wheel 13. The second gear train 7 comprises a third gear wheel 17 rotatably mounted on the input shaft 3 and a fourth gear wheel 19 fixed to the output shaft 1 in mesh with the third gear wheel 17. The third gear train 9 comprises a fifth gear wheel 21 rotatably mounted on the input shaft 3 and a sixth gear wheel 23 fixed to the output shaft 1 in mesh with the fifth gear wheel 21. The fourth gear train 11 comprises a seventh gear wheel 25 rotatably mounted on the input shaft 3 and an eighth gear wheel 27 fixed to the output shaft 1 in mesh with the seventh gear wheel 25. The fifth gear train 12 comprises a ninth gear wheel 16 rotatably mounted on the input shaft 3 and a tenth gear wheel 18 fixed to the output shaft 1 in mesh with the ninth gear wheel 16. The sixth gear train 14 comprises an eleventh gear wheel 22 rotatably mounted on the input shaft 3 and a twelfth gear wheel 24 fixed to the output shaft 1 in mesh with the seventh gear wheel 25.

First, second and third selector mechanisms 29,31,33 are also mounted on the input shaft 3. Each selector mechanism 29,31,33 is arranged to selectively transmit drive between the input shaft 3 and output shaft 1 via the gear trains by selectively locking the gear wheels rotatably mounted on the input shaft 3 for rotation with the input shaft 3. The first selector mechanism 29 is arranged to selectively lock the first gear wheel 13 from the $1^{st}$ gear ratio and third gear wheel 17 from the $2^{nd}$ gear ratio for rotation with the input shaft 3. The second selector mechanism 31 is arranged to selectively lock the fifth gear wheel 21 from the 3rd gear ratio and the seventh gear wheel 25 from the 4th gear ratio for rotation with the input shaft 3. The third selector mechanism 31 is arranged to selectively lock the ninth gear wheel 16 from the 5th gear ratio and the eleventh gear wheel 22 from the $6^{th}$ gear ratio for rotation with the input shaft 3.

When a gear wheel is engaged by a gear selector mechanism it is locked for rotation with the input shaft 3. So, for the third gear train 9, when the second gear selector mechanism 31 engages the fifth gear wheel 21 and the first and third gear selector mechanisms 29,33 are in neutral (no gear wheels engaged) drive is transmitted between the input and output shafts 3,1 via the third gear train 9.

Selector and Actuator Mechanisms

Each selector mechanism 29,31,33 is similar and is mounted on the input shaft 3 in a similar manner. The structure of the first gear selector mechanism 29 and the way that it selectively engages the first and third gear wheels 13,17 will now be described. However the general structure and principles of operation are applicable to the second and third gear selector mechanisms 31,33 and their respective gear wheels.

The gear selector mechanism 29 is arranged to engage drive formations 20 located on the first and third gear wheels 13,17. The drive formations 20 on each gear wheel 13,17 comprise groups of dogs (similar drive formations are located on the fifth, seventh, ninth and eleventh gear wheels 21,25, 16,22).

Figure 2:
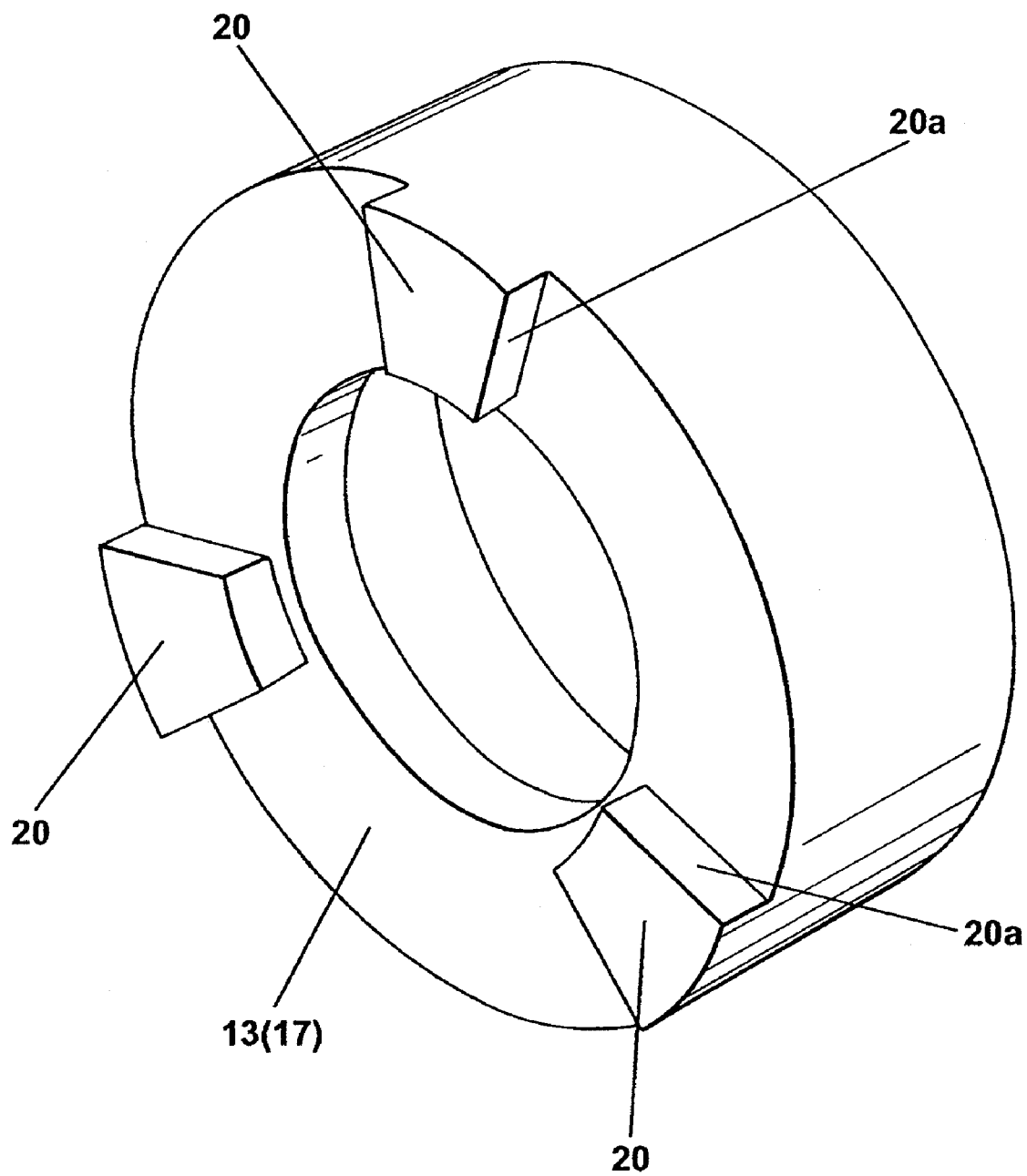
FIG. 2 is a schematic that illustrates the arrangement of a group of dogs on a side of a gear (teeth omitted for clarity)

The first dog group 20 is located on one side of the first gear wheel 13. The dogs are preferably formed integrally with the first gear wheel, but this is not essential. The first dog group 20 comprises three dogs evenly circumferentially distributed about the gear face, i.e. the angle subtended between the centres of a pair of dogs is approximately 120° (see FIGS. 2 and 3). The second dog group 20, comprises three dogs and is similarly arranged on one side of the third gear wheel 17. Three dogs are used because this arrangement provides large engagement windows, that is the spaces between the dogs, to receive the engagement elements and because of its inherent self-centring affect and even load distribution. Large engagement windows provide greater opportunities for the first gear selector mechanism 29 to fully engage the gear wheels 13,17 before transmitting drive thereto. If the first gear selector mechanism 29 drives a gear wheel when only partially engaged it can lead to damage of the dogs and/or the first gear selector mechanism 29.

The first and third gear wheels 13,17 are mounted spaced apart on the input shaft 3 and are arranged such that the sides including the first and second dog groups face each other.

The first gear selector mechanism 29 includes first and second sets of engagement elements 35,36 and an actuator assembly 38.

The first and second sets of engagement elements 35,36 are mounted on the input shaft 3 between the first and third gear wheels 13,17. The first set of engagement elements 35 comprises three elements 28 that are evenly distributed about the input shaft 3 such that their bases face inwards, and the axes of the elements 28 are substantially parallel. The second set of engagement elements 36 comprises three elements 30 which are similarly arranged about the input shaft 3.

Figure 3:
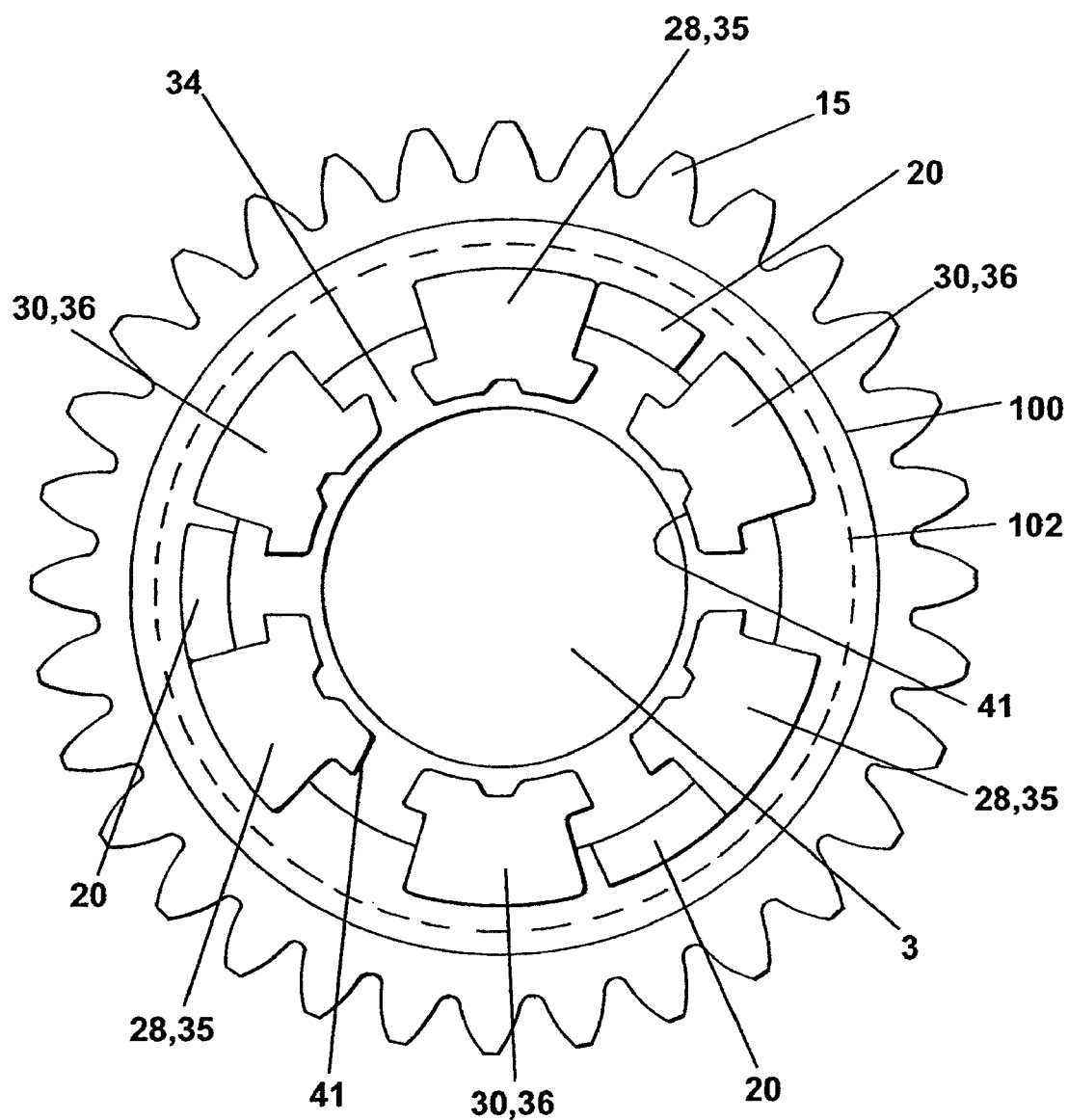
FIG. 3 is a schematic that illustrates the interaction of a selector mechanism and the dogs on the side of a gear wheel.

The sets of engagement elements 35,36 are mounted on a sleeve 34 which is mounted on the input shaft 3 between the first and second gear wheels 3,5 (see FIGS. 1 and 3). The sets of engagement elements 35,36 are arranged to rotate with the input shaft 3 but are able to slide axially along the sleeve 34 and the input shaft 3 in response to a switching action of the actuator assembly 38. To facilitate this, the sleeve 34 includes six keyways 41 formed in its curved surface with each engagement element 28,30 having a complementary formation in its base. The keyways 41 may have substantially T-shaped profiles such that the elements are radially and tangentially (but not axially) restrained within the keyways 41 (see FIG. 2). Alternatively, the keyways 41 can have slotted or dovetailed profiles to radially restrain the elements, or any other suitable shape.

Preferably the elements are configured to be close to the input shaft 3 to prevent significant cantilever effects due to large radial distances of loaded areas thus reducing the potential for structural failure.

The arrangement of the element sets 35,36 is such that elements of a particular set are located in alternate keyways 41 and the element sets 35,36 can slide along the sleeve 34. The elements in each element set are rigidly connected to each other by an annular connector member 100 and move as a unit. Each element set can move independently of the other. The connector member 100 has a groove 102 formed in its outer curved surface that extends fully around the connector member. The elements 28 in the first set of engagement elements 35 are preferably integrally formed with its connector member 100, though this is not critical. The elements 28 are evenly distributed about the connector member 100. The second set of engagement elements 36 comprises three elements 30, which are held in a similar fixed arrangement by a second connector member 100. When there is relative movement between the first and second sets of elements 35,36, the connector member 100 of the first element set 35 moves over the second set of elements 36 and the connector member 100 of the second element set 36 slides over the first set of elements 35.

Each element 28 in the first element set 35 has a first end 28a arranged to engage the first group of dogs 20 attached to the first gear wheel 13 and a second end 28b arranged to engage the second group of dogs 20 on the third gear wheel 17. The first and second ends 28a,28b typically have the same configuration but are opposite handed, for example the first end 28a is arranged to engage the first group of dogs 20 during deceleration (reverse torque direction) of the first gear wheel 13 and the second end 28b is arranged to engage the second group of dogs 20 during acceleration (forward torque direction) of the third gear wheel 17. Each element 30 in the second element set 36 is similarly arranged, except that the first end 30a is arranged to engage the first group of dogs 20 during acceleration of the second gear wheel 15 and the second end 30b is arranged to engage the second group of dogs 20 during deceleration of the third gear wheel 17.

When both the first and second sets of engagement elements 35,36 engage a gear wheel drive is transmitted between the input and output shafts 3,1 whether the gear is accelerating or decelerating.

Figure 4:
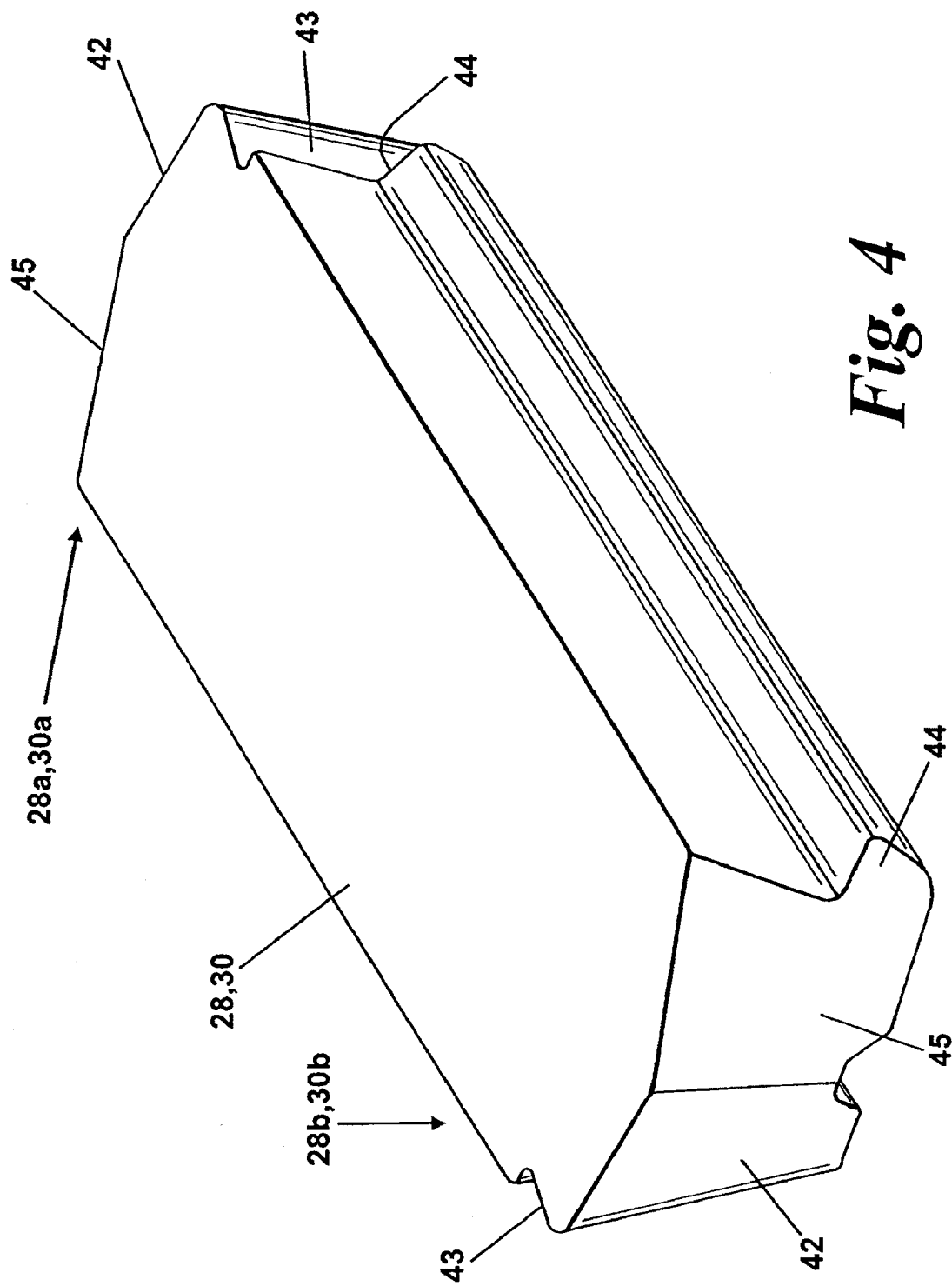
FIG. 4 is a perspective view of an engagement element from the selector mechanism.

The first and second ends 28a,30a,28b,30b of each element include an engagement face 43 for engaging the dogs 20, a ramp 45, an end face 42 and may include a shoulder 44 (see FIG. 4). The end faces 42 limit the axial movement of the engagement elements 28,30 by abutting the sides of the gear wheels. The engagement faces 43 may be angled to complement the sides of the dogs 20a so that as the engagement elements 28,30 rotate into engagement, there is face-to-face contact to reduce wear. Each ramp 45 is preferably helically formed and slopes away from the end face 42. The angle of inclination of the ramp 45 is such that the longitudinal distance between the edge of the ramp furthest from the end face 42 and the plane of the end face 42 is larger than the height of the dogs 20. This ensures that the transmission does not lock up when there is relative rotational movement between the engagement elements 28,30 and the dogs 20 that causes the ramp 45 to move towards engagement with the dogs 20. The dogs 20 do not crash into the sides of the engagement elements 28,30 but rather engage the ramps 45. As further relative rotational movement between the dogs 20 and the engagement elements 28,30 occurs, the dogs 20 slide across the ramps 45 and the helical surfaces of the ramps cause the engagement elements 28,30 to move axially along the input shaft 3 away from the dogs 20 so that the transmission does not lock up.

The arrangement of the gear selector mechanism is such that it inherently prevents lockup of the transmission occurring when selecting a new gear.

When the elements of the first and second sets 35,36 are interleaved, as in FIG. 3, the engagement faces 43 of the first ends 28a of the first set of elements 35 are adjacent the engagement faces 43 of the first end 30a of the second set of elements 36. When the first and second sets of elements 35,36 are fully engaged with a gear, a dog 20 is located between each pair of adjacent engagement faces 43. The dimensions of the dogs 20 and the ends of the elements are preferably such that there is little movement of each dog between the engagement face 43 of the acceleration element and the engagement face 43 of the deceleration element when the gear moves from acceleration to deceleration, or vice versa, to ensure that there is little or no backlash in the gear.

The actuator assembly 38 includes first and second actuators 46,64 and first and second actuator members 48,58. The first and second actuators 46,64 are force generator actuators and preferably part of an electrical system for example, an electro-mechanical system or an electro-hydraulic system. The first and second actuator members 48,58 are mechanical drive members that transmit force from the first and second actuators to 46,64 to the sets of engagement members 35,36 and are preferably in the form of independently controllable forks. Accordingly, the first set of engagement elements 35 is driven by the first actuator 46 via the first fork 48 and the second set of engagement elements 36 is driven by the second actuator 64 via the second fork 58. Thus the first and second sets of engagement elements 35,36 move totally independently of each other unlike known systems, such as the system of WO 2004/099654, which only has a single actuator for controlling actuation of both sets of engagement elements. With the known systems the sets of engagement elements can move relative to each other however the actuation of each set of engagement elements is interdependent since there is only a single actuator for initiating movement.

Each fork 48,58 is arranged to extend approximately 180 degrees around the groove 102 of its respective set of engagement elements and includes a semi-annular part that is located within the groove 102. Each set of engagement elements 35,36 can rotate relative to its respective fork 48,58 and is caused to move axially along the input shaft 3 by the actuator member 48,58 applying a force to the connector member 100.

Optionally the actuator assembly 38 may include resilient means, such as helical springs (not shown). The springs are arranged to bias the first and second sets of engagement elements 35,36 to move in an axial direction when they are in driving engagement with a gear wheel and are unable to move. For example, the forks 48,58 can be suspended at their remote ends in cradles and can be arranged to move a limited amount with respect to the cradle against the action of the spring. The actuator is arranged to act on the cradle. If the set of engagement elements is loaded, the cradle is still moved by the actuator however the engagement elements remain engaged and are biased away from the engaged gear wheel by the spring element. When the engagement elements become unloaded, they will be forced out of engagement from the gear wheel by the spring element.

Operation of the first and second actuators 46,64, and hence movement of the first and second sets of engagement elements is controlled by the transmission control unit 90. When transmission position sensors 96 are used, they are arranged for determining the operational conditions of selector mechanisms 29,31,33 in the transmission. Typically the position sensors 96 monitor the positions of the actuator members 48,58 and hence the positions of the sets of engagement elements to determine whether they are engaged with a gear wheel or not. However, they can be arranged to monitor the positions of the sets of engagement elements directly in some applications to obtain the same effect. Typically there are the same number of position sensors 96 as there are sets of engagement elements or actuator members 48,58. In this case, there are two position sensors 96 per selector mechanism 29,31,33, giving six in total.

Conveniently the position sensors 96 can be included in the actuators 46,64 to provide a compact arrangement. The position sensors 96 can be of any suitable type such as hall effect type sensors.

If position sensors 96 are not used, the positions of the sets of engagement elements 35,36 are calculated by the transmission control unit 90 from the known geometry of the transmission and the controlled actuation of the sets of engagement elements 35,36.

The transmission control unit 90 is an electronic logic control system driven by software that is arranged to control operation of the first and second actuators 48,64 and hence the first and second sets of engagement elements 35,36. It is the sequence programming that enables the transmission control unit 90 to automatically control the transmission to prevent conflict shifts occurring. Being able to control the actuation of the first and second sets of engagement elements 35,36 totally independently by use of first and second actuators 46,64 and the first and second actuator members has the advantage that the magnitude and the timing of application of the biasing force applied by each actuator can be independently and accurately controlled. This means that even at low rotational gear speeds the engagement elements sets 35,36 do not accidently disengage from the engaged gear wheel and thus no loss of drive is experienced.

Optionally, the transmission control unit 90 can have two layers of control: a first layer for controlling operation of the selector mechanisms 29,31,33 and a second level that monitors operation of the first level of control to ensure that the first layer of control is operating correctly.

The transmission 88 can be fully automatic, that is gear selections are made by the transmission control unit 90 when the engine control unit 82 detects predetermined operational conditions, for example when the engine 80 reaches a particular speed in a particular gear. Alternatively, gear selection can be made by the user of the drive system by initiating the gear selection input device 94, for example a gear lever (manual) or switches located adjacent the steering wheel (semi-automatic). The transmission 88 can be arranged such that it is possible to select between the automatic and manual modes.

Operation of a Single Gear Selector Mechanism

The operation of the first gear selector mechanism 29 will now be described with reference to FIGS. 5a-5f which for clarity illustrate diagrammatically the movement of the first and second element sets 35,36 by the relative positions of only one element from each set.

Figure 5A:
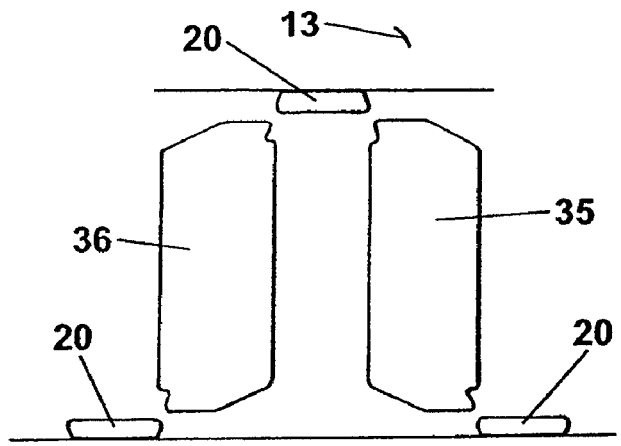
FIG. 5a-f illustrate diagrammatically operation of the selector mechanism.
Figure 5B:
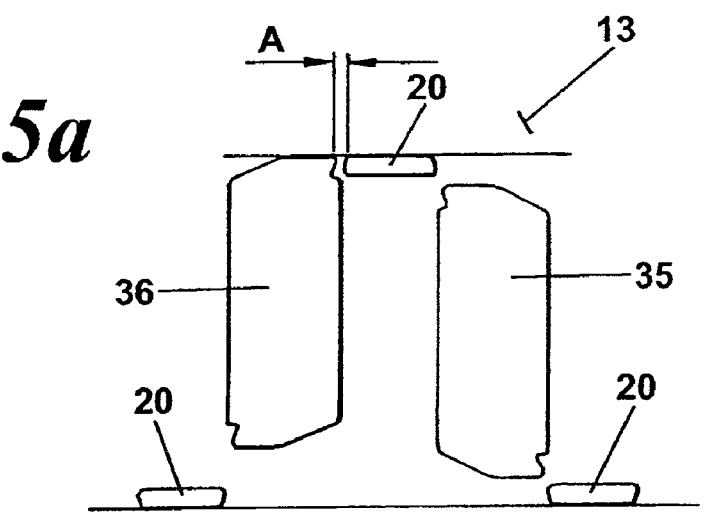

FIG. 5a shows the first and second element sets 35,36 in a neutral position, that is, neither element set is engaged with a gear wheel. FIG. 5b shows the first and second element sets moving into engagement with the first gear wheel 13 under the action of the first and second actuators 46,64 in response to a gearshift request from the input device 94. Preferably, the clutch is opened for the first gearshift.

Figure 5C:
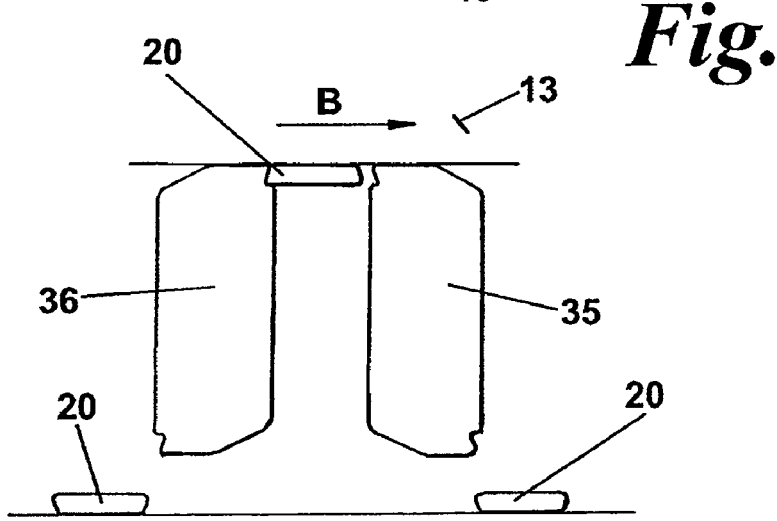
Figure 5D:
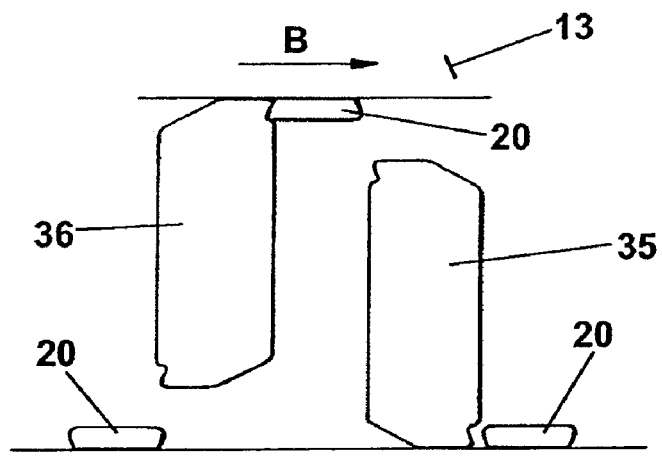

FIG. 5c shows a condition when the first gear wheel 13 is fully engaged, that is, the elements 28,30 are interleaved with the first group of dogs 20. The first and second actuators 46,64 are arranged such that the actuator members 48,58 maintain the first and second element sets 35,36 in engagement with the first gear wheel 13. Accordingly, drive is transferred through the first gear wheel 13 to the input shaft 3 via the first element set 35 when decelerating and via the second element set 36 when accelerating.

Whilst accelerating (first gear wheel 13 rotating in the direction of arrow B in FIG. 5c) using the first gear train 5, the engagement faces 43 of the elements of the first element set 35 are not loaded, whilst the engagement faces 43 of the elements of the second element set 36 are loaded. When a user, or an engine control unit 82 wishes to engage the second gear train 7 an input signal is sent from the input device 94 or the engine control unit 82 to the transmission control unit 90. The transmission control unit 90 sends a signal to the clutch actuator 92 to reduce the clutch clamp load until the transmission control unit 90 detects relative rotational movement (slip) between the input and output sides of the clutch based on signals received from the clutch sensors 93. For example, the transmission control unit 90 may detect around a 1% difference in rotational speeds. The transmission control unit 90 also actuates the first actuator 46 to drive the first actuator member 48, which causes the elements 28 of the first element set 35 to slide axially along the keyways 41 in the sleeve 34 thereby disengaging the first element set 35 from the first gear wheel 13 (see FIG. 5d).

The second actuator 64 is activated to move the second actuator member 58 and hence the second element set 36 towards the third gear wheel 17. However, because the second element set 36 is loaded, i.e. is driving the first gear wheel 13, it cannot be disengaged from the first gear wheel 13, and the second element set 36 remains stationary, with the second actuator 64 biasing it towards the third gear wheel 17.

Figure 5E:
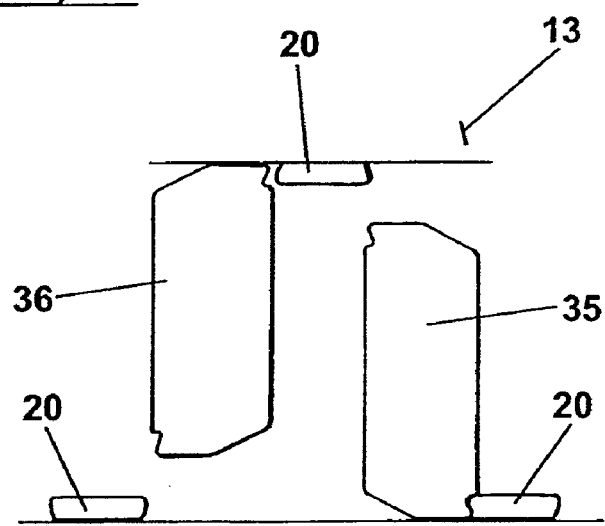
Figure 5F:
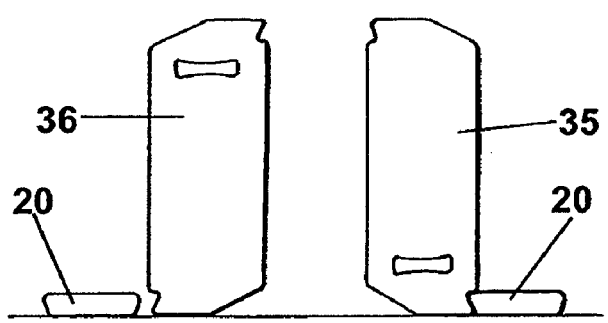
Figure 6A:
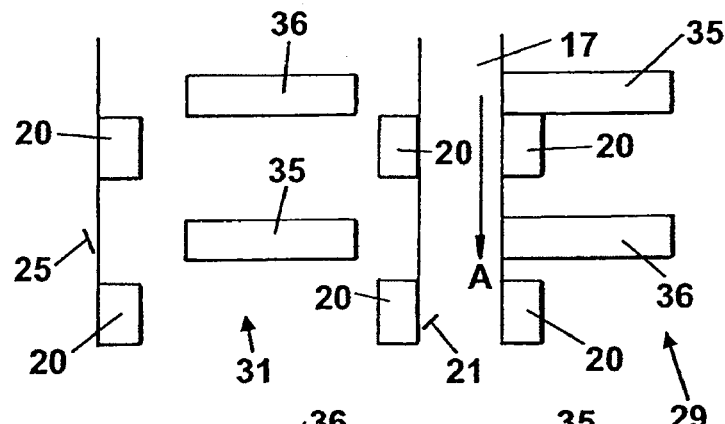
FIG. 6a-d illustrate diagrammatically the selection of a new gear requiring movement of two selector mechanisms when performing an accelerating upshift.
Figure 6A:
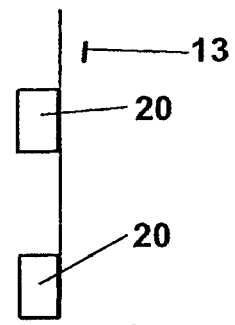
Figure 6B:
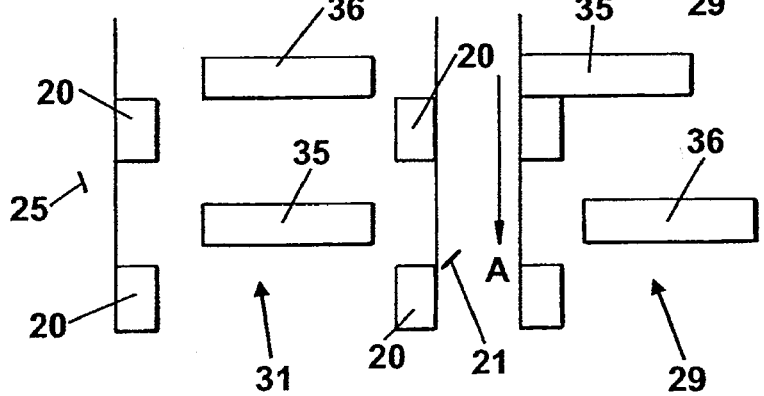
Figure 6B:
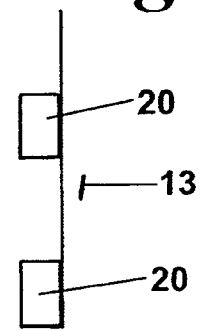
Figure 6C:
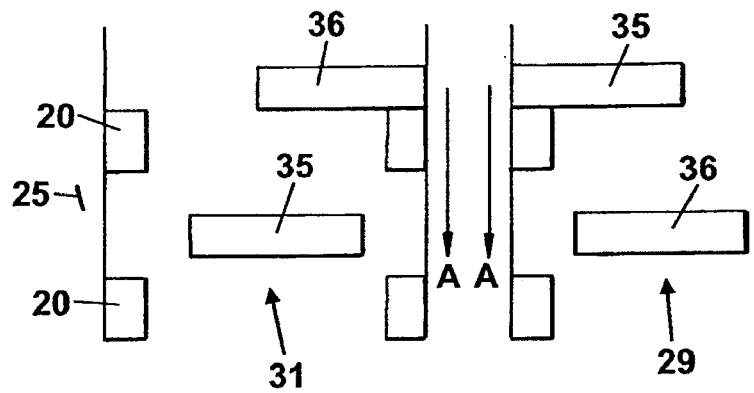
Figure 6C:
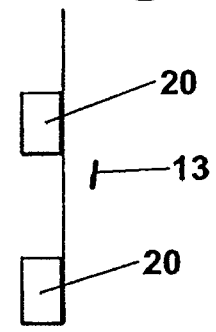
Figure 6D:
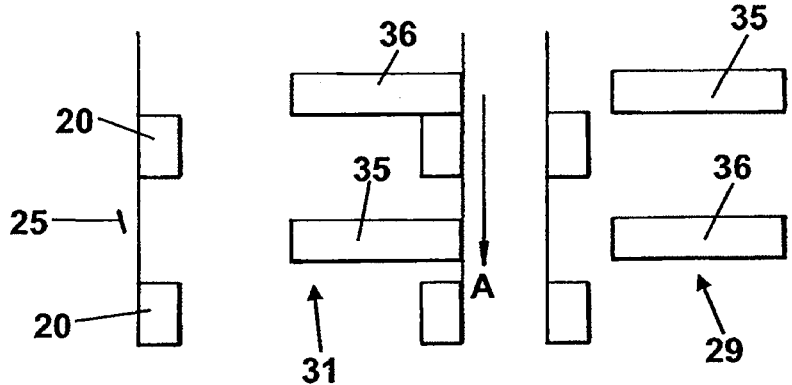
Figure 6D:
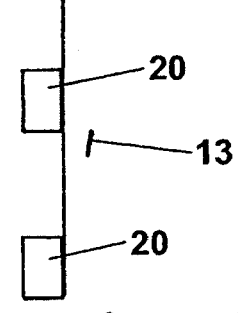
Figure 7A:
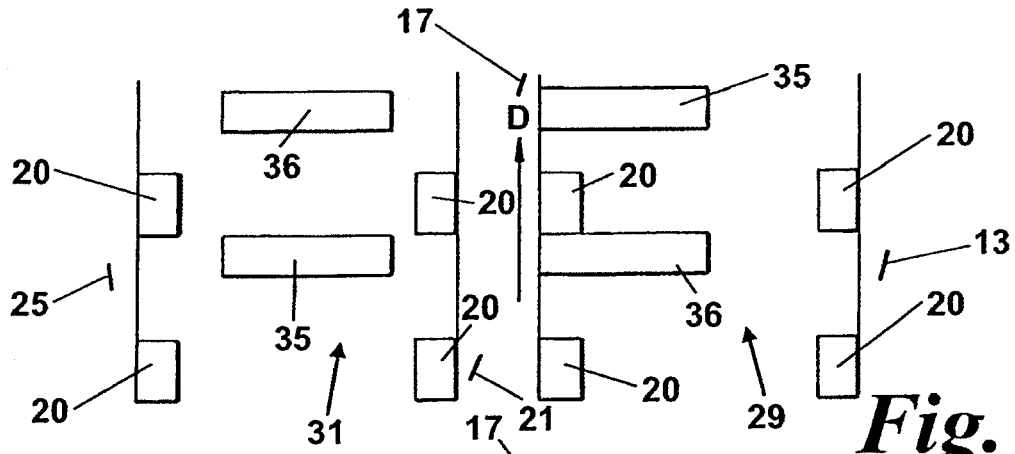
FIG. 7a-d illustrate diagrammatically the selection of a new gear requiring movement of two selector mechanisms when performing an decelerating upshift.
Figure 7B:
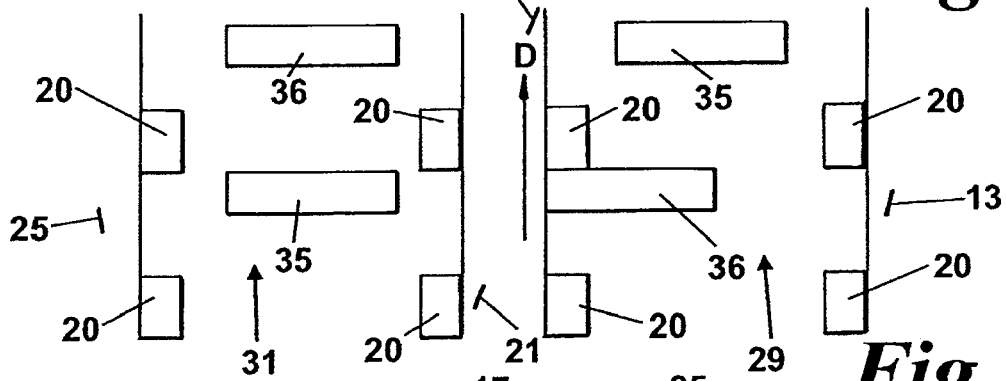
Figure 7C:
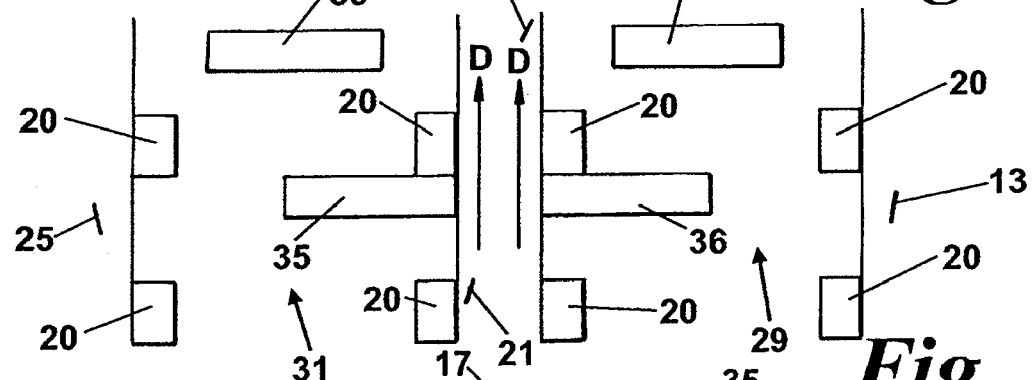
Figure 7D:
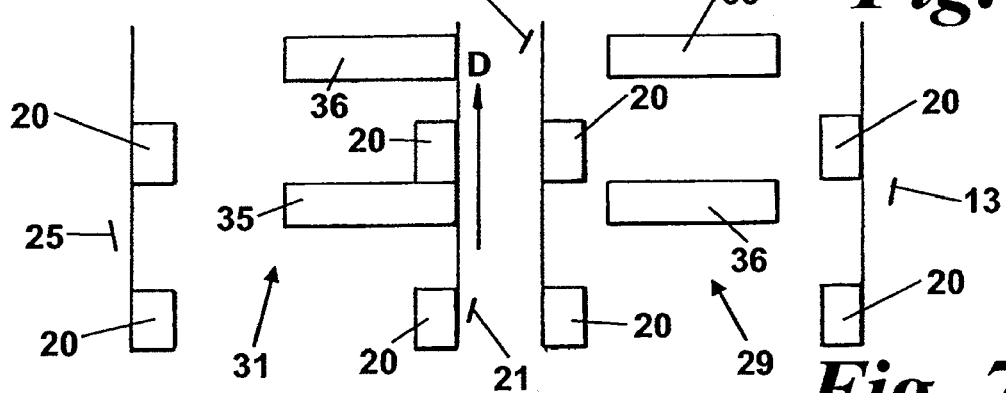
Figure 8A:
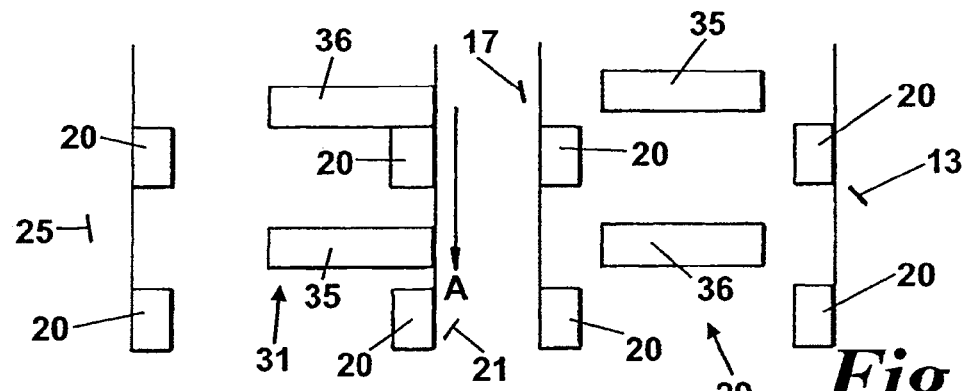
FIG. 8a-d illustrate diagrammatically the selection of a new gear requiring movement of two selector mechanisms when performing an accelerating downshift.
Figure 8B:
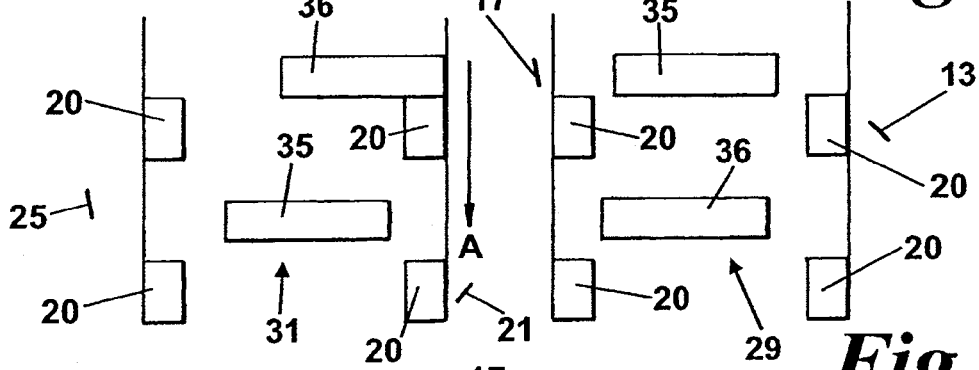
Figure 8C:
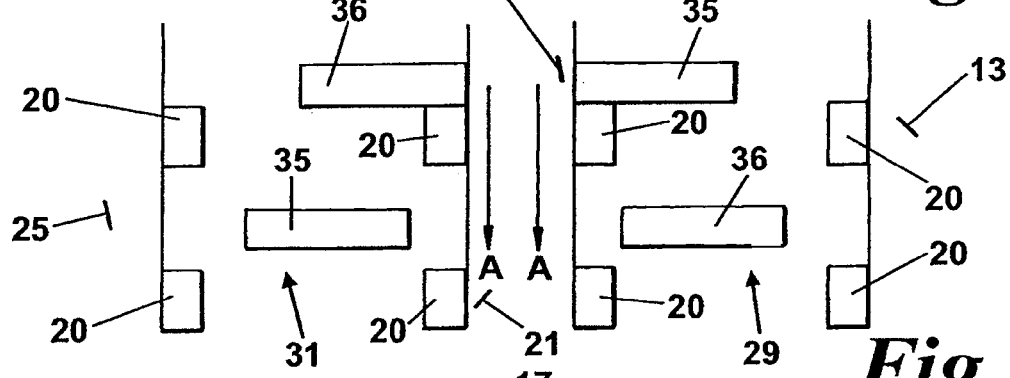
Figure 8D:
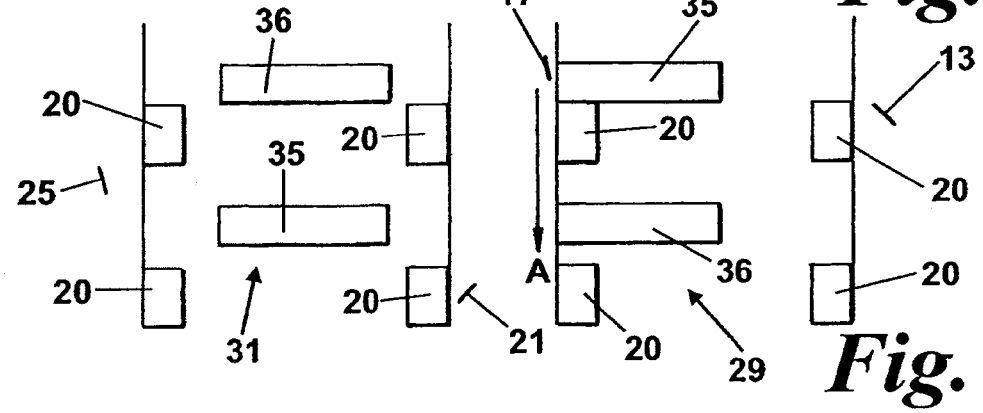
Figure 9A:
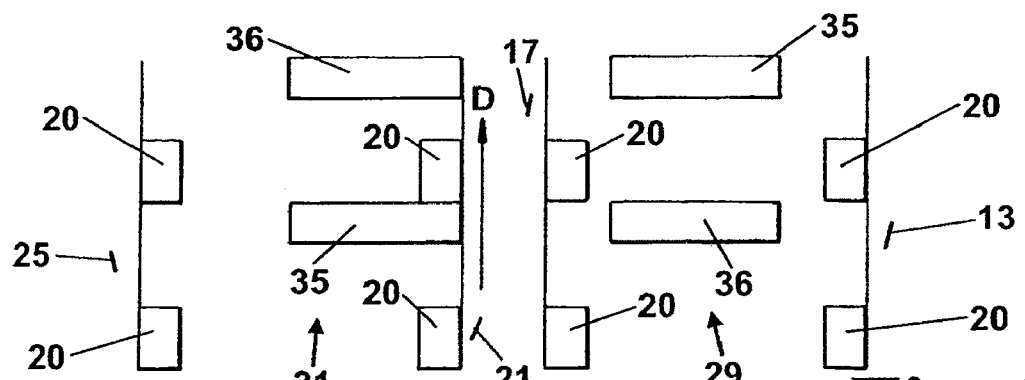
FIG. 9a-d illustrate diagrammatically the selection of a new gear requiring movement of two selector mechanisms when performing an decelerating downshift.
Figure 9B:
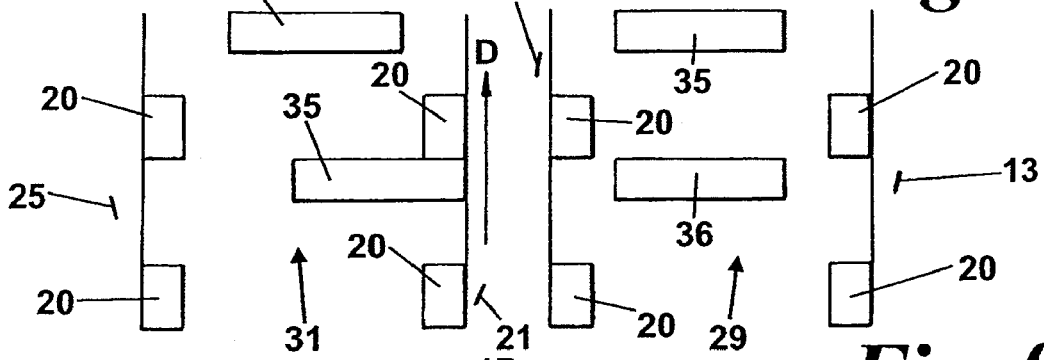
Figure 9C:
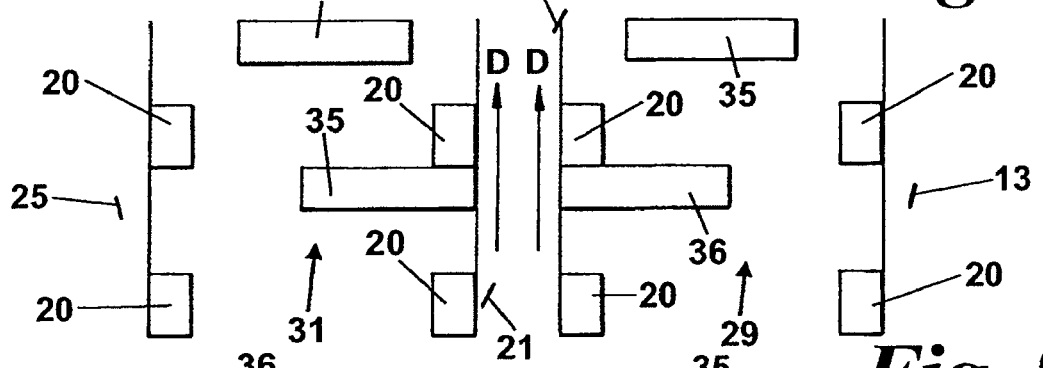
Figure 9D:
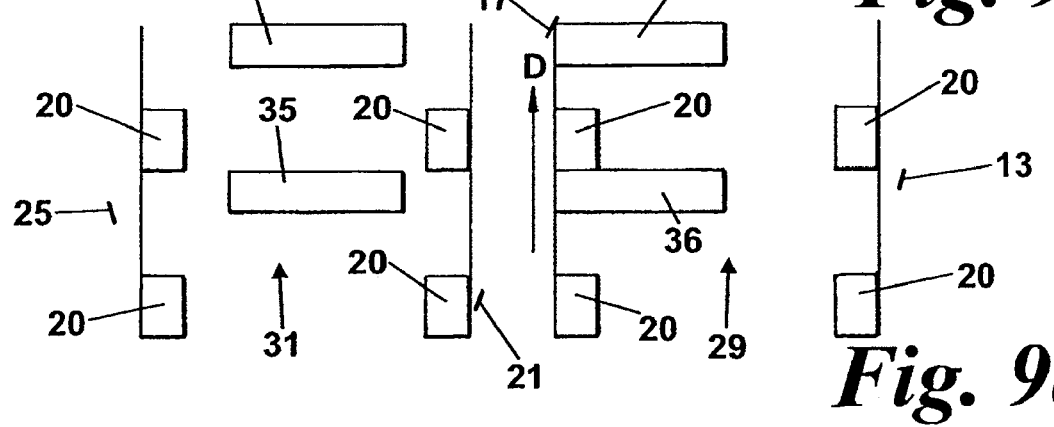

When the first element set 35 slides axially along the input shaft 3, the engagement faces 43 engage the second group of dogs 20 (see FIG. 5e). The torque spike caused by the engagement is minimised by allowing further relative rotation of the input and output sides of the clutch 86. The elements 28 then begin to drive the third gear wheel 17 in the direction of Arrow C in FIG. 5e and drive is transmitted between the input and output shafts 3,1 via the second gear train 7. As this occurs, the second element set 36 ceases to be loaded, and is free to disengage from the first group of dogs 20. Since the second element set 36 is biased by the second actuator 64 it slides axially along the keyways 41 in the sleeve 34 thereby completing the disengagement of the first gear wheel 13 from the input shaft 3. The second element set 36 slides along the keyways 41 until it engages the third gear wheel 17, thereby completing engagement of the third gear wheel 17 with the input shaft 3 (see FIG. 5f).

The transmission control unit 90 restores clutch clamp load using the clutch actuator 92 and returns control of the engine 80 to the driver.

This method for selecting gear trains substantially eliminates torque interruption since the second gear train 7 is engaged before the first gear train 5 is disengaged, thus momentarily, the first and second gear trains 5,7 are simultaneously engaged and locked for rotation with the input shaft 3, until the newly engaged gear wheel overdrives the original gear wheel. Thus gearshifting is instantaneous.

When a gear wheel is engaged by both the first and second element sets 35,36 it is possible to accelerate or decelerate using a gear wheel pair with very little backlash occurring when switching between the two conditions. Backlash is the lost motion experienced when the dog moves from the engagement face 43 of the acceleration element to the engagement face 43 of the deceleration element when moving from acceleration to deceleration, or vice versa. A conventional dog-type transmission system has approximately 30 degrees of backlash. A typical transmission system for a car in accordance with the current invention has backlash of less than four degrees.

Backlash is reduced by minimising the clearance required between an engagement member and a dog during a gearshift: that is, the clearance between the dog and the following engagement member (see measurement 'A' in FIG. 5b). The clearance between the dog and the following engagement member is in the range 0.5 mm-0.03 mm and is typically less than 0.2 mm. Backlash is also a function of the retention angle, that is, the angle of the engagement face 43, which is the same as the angle of the undercut on the engagement face of the dog 20a. The retention angle influences whether there is relative movement between the dog and the engagement face 43. The smaller the retention angle, the less backlash that is experienced. The retention angle is typically between 0 and 15 degrees.

Transition from the second gear train 7 to the first gear train 5 whilst decelerating is achieved by a similar process.

Whilst decelerating in the second gear train 7 the engagement surfaces 43 of the elements of the first element set 35 are not loaded, whilst the engagement surfaces 43 of the elements of the second element set 36 are loaded. When a user, or an engine control unit 82 wants to engage the first gear train 5 a signal is sent from the input device 94 or the engine control unit 82 to the transmission control unit 90. The transmission control unit sends a signal to the clutch actuator 92 to reduce the clutch clamp load until the transmission control unit 90 detects relative rotational movement (slip) between the input and output sides of the clutch based on signals received from the clutch sensors 93. The transmission control unit 90 then synchronises the engine speed via the engine control unit 82 to the new gear wheel to be selected. The transmission control unit 90 actuates the first actuator 46 to move the first actuator member 48 axially, causing the first element set 35 to slide axially in the keyways 41 along the input shaft 3 in the direction of the first gear wheel 13, thereby disengaging the first element set 35 from the third gear wheel 17.

The transmission control system activates the second actuator 64 however since the second element set 36 is loaded, i.e. it is drivingly engaged with the dogs 20 on the third gear wheel 17, it remains stationary but is urged towards the first gear wheel 13.

As the first element set 35 slides axially in the keyways 41 and engages the dogs 20 on the first gear wheel 13 and begins to drive the first gear wheel 13 such that energy is transmitted between the input and output shafts 3,1 by way of the first gear train 5. The torque spike caused by the engagement is minimised due to the speed synchronisation step. However if a torque spike is generated its effect is mitigated by further relative rotation of the input and output sides of the clutch 86. As this occurs, the second element set 36 ceases to be loaded and biasing of the second actuator 64 causes it to slide axially within the keyways 41 along the input shaft 3 towards the first gear wheel 13, thereby completing disengagement of the third gear wheel 17. The second element set 36 continues to slide within the keyways 41 along the input shaft 3 until it engages the first gear wheel 13, thereby completing engagement of the first gear wheel 13 with the input shaft 3.

The transmission control unit 90 restores clutch clamp load using the clutch actuator 92 and control of the engine 80 is returned to the driver.

Kick-down shifts, that is a gearshift from a higher gear train to a lower gear train but where acceleration takes place, for example when a vehicle is travelling up a hill and the driver selects a lower gear to accelerate up the hill, require a brief torque interruption to allow disengagement of the driving element set. For example, when accelerating in $2^{nd}$ gear the third gear wheel 17 is fully engaged by the first and second sets of engagement elements 35,36 and the first element set 35 drivingly engages the dogs 20. When a kick-down shift is requested by the user via the input device 94 or the engine control unit 82, the transmission control unit 90 reduces the clutch clamp load using the clutch actuator 92 until relative rotational movement (slip) between the input and output sides of the clutch is detected by the transmission control unit 90 via the clutch sensor 93 readings. The engine speed is then adjusted to synchronise with the new gear speed ($1^{st}$ gear in this case), which typically involves increasing the engine speed. The transmission control unit 90 is able to synchronise the speed since it is programmed with information relating to the gear ratios for each gear train and can determine the currently engaged gear and the new gear to be selected. Synchronising the engine speed in this manner has a smoothing effect when engaging the new gear and prevents the vehicle from lurching when the gear is selected. The clutch clamp load is then further reduced as is the throttle in order to maintain the new ratio speed. The loaded 35 and the unloaded element sets 36 are then disengaged from the third gear wheel 17 by actuating the first and second actuators 46,64 such that loaded set disengages the third gear wheel 17 prior to the unloaded set 36 engaging the first gear wheel 13. The torque spike caused by the engagement is minimised due to the speed synchronisation step. However if a torque spike is generated its effect is mitigated by further relative rotation of the input and output sides of the clutch 86. In practice it is preferable to reduce the torque transmittable by the clutch to zero, or near zero, or at least sufficiently low such that the actuators 46,64 are able to move the sets of engagement before disengaging the loaded set of engagement elements 35. Although the shift is not entirely instantaneous, it is very quick and the power interruption is lower than previous methods and may not even be noticed by the driver. The first element set 35 is then moved across into engagement with the first gear wheel 13 to complete the kick-down shift. After which, the torque is reinstated by the engine control unit 82, the clutch clamp load is restored by the clutch actuator 92 and control of the engine 80 is returned to the user.

When the unloaded second element set 36 is disengaged from the third gear wheel 17, it can alternatively be held in the neutral position until after the loaded first element set 35 is disengaged from the third gear wheel 17. The second element set 36 can then be moved into engage the first gear wheel 13, after which the torque and clutch are reinstated. This shift is not instantaneous.

Transmission Layout

In the transmission configuration shown in FIG. 1*b* all the selector mechanisms 29,31,33 are mounted on the input shaft 3. The transmission is arranged such that the deceleration drive faces of the first set of engagement elements 35 of the first gear selector mechanism 29 are engageable with the first gear wheel 13 and the acceleration drive faces are engageable with the third gear wheel 17 (see FIG. 1). The second set of engagement elements 36 of the first gear selector device 29 is arranged such that the acceleration drive faces are engageable with the first gear wheel 13 and the deceleration faces are engageable with the third gear wheel 17.

The first set of engagement elements 35 of the second selector mechanism 31 is arranged such that the deceleration drive faces are engageable with the fifth gear wheel 21 and the acceleration drive faces are engageable with the seventh gear wheel 25. The second set of engagement elements 36 is arranged such that the acceleration drive faces are engageable with the fifth gear wheel 21 and the deceleration faces are engageable with the seventh gear wheel 25.

The first set of engagement elements 35 of the third selector mechanism 33 is arranged such that the deceleration drive faces are engageable with the ninth gear wheel 16 and the acceleration drive faces are engageable with the eleventh gear wheel 22. The second set of engagement members 36 is arranged such that the acceleration drive faces are engageable with the ninth gear wheel 16 and the deceleration faces are engageable with the eleventh gear wheel 22.

Selection of a New Gear Requiring the Movement of Two Gear Selector Mechanisms

One of the failure modes that exists with known instantaneous transmissions is that if a torque reversal occurs during a shift requiring the movement of two gear selector mechanisms, for example when selecting between $2^{nd}$ and $3^{rd}$ gears, the transmission may lock up in the worst case causing catastrophic failure. The current invention addresses this problem in three ways: (1) disengaging the set(s) of engagement elements having engagement faces 43 in the opposite direction from the direction of torque in the transmission prior to engaging the new gear ratio, (2) controlling the torque applied to the transmission 88 to ensure that during the gearshift the torque does not change direction, and (3) performing a safety checking routine to ensure that conditions within the transmission system are suitable to allow the shift to take place before undertaking the shift.

Disengaging the set(s) of engagement elements having engagement faces 43 in the opposite direction from the direction of torque in the transmission prior to engaging the new gear ratio typically involves moving the unloaded element set out of engagement with the currently engaged gear wheel into a neutral position. In most cases, the other selector mechanisms will already be in the neutral position when a gearshift is initiated and therefore it is not necessary to move their sets of engagement elements before performing the gearshift. If the engagement elements having engagement faces 43 in the opposite direction from the direction of torque in the transmission prior to engaging the new gear ratio are disengaged and there is a torque reversal during the gearshift, the transmission 88 cannot lock up since the ramped faces 45 of the engaged element set will cause the engaged element set to move outward from the engaged gear wheel so that it can move past the dogs 20.

Controlling the torque applied to the transmission 88 to ensure that during the gearshift the torque does not change direction is achieved by the transmission control unit 90 determining the direction of torque in the transmission prior to the shift from readings taken form at least one of the clutch sensors 93, and/or with the sensor system 84, and controlling the output of the engine 80 with the engine control unit 82 and/or the torque transmitted by the clutch 86 using the clutch actuator 92. This arrangement provides flexibility for controlling torque applied to the transmission and also helps to enable a smooth gearshift since the clutch clamp load can be adjusted to absorb torque spikes generated when a new gear wheel is engaged.

The transmission control unit 90 performs a checking routine prior to moving the engagement members to ensure that the conditions are safe to make the shift, i.e. lock up will not occur. This includes checking the positions of the sets of engagement members and the direction of torque in the transmission. If the unit 90 determines that the conditions are not correct for engaging the new gear wheel with new gear selector mechanism, the transmission control unit 90 can abort the gearshift or postpone the engagement for a short period of time, for example 1 to 80 ms, or until it determines that the conditions are correct to proceed. For example, if the events preventing the shift end within a predetermined period, say within 10 ms of instigating the hold, the transmission control unit 90 can recognise this and performs the shift. The control system 90 can be instructed to wait for a predetermined period of time after the events have ended before instigating the shift such as 1 to 20 ms to ensure that the transmission is sufficiently stable for the shift to take place. This does not effect the perceived shift quality by the driver since events that take place in less than 100 ms are typically undetectable by the driver of the vehicle.

The three methods in which the failure mode mentioned above is addressed can be used independently of each other in the transmission 88, or together. The best results are achieved using all three techniques since if either one of the operations is not successfully performed, for example due to a software fault, the other method will act as a backup system. Also, although disengaging the set(s) of engagement elements having engagement faces 43 in the opposite direction from the direction of torque in the transmission prior to engaging the new gear ratio can prevent lock up alone, it is undesirable to have the engagement elements ramping out of engagement since this can be noisy and wear component parts. Furthermore, if the engagement elements having engagement faces 43 in the opposite direction from the direction of torque in the transmission are not disengaged, this can cause a problem when performing kick-down shifts (accelerating downshifts) since a brief torque interruption is sometimes necessary to remove the engaged element set from the current gear.

The selection of a new gear requiring the movement of two gear selector mechanisms will now be described with reference to FIGS. 6a to 9d, which show a sequence of gear changes between $2^{nd}$ and $3^{rd}$ gears under the following conditions: (1) accelerating upshift (FIGS. 6a-d), (2) decelerating upshift (FIGS. 7a-d), (3) accelerating downshift (FIGS. 7a-d), and (4) decelerating downshift (FIGS. 9a-d). However the general principles apply to any other gearshift requiring movement of two selector mechanisms, for example when selecting between $4^{th}$ and $5^{th}$ gears in a five or six speed transmission.

Accelerating Upshift

When accelerating in $2^{nd}$ gear, the first element set 35 of the first gear selector mechanism 29 drivingly engages the dogs 20 on the third gear wheel 17 and the second element set 36 is unloaded. The first and second sets of engagement elements 35,36 of the second gear selector mechanism 31 are in a neutral position (see FIG. 6a). When a gear change is initiated from the engine control unit 82 or by the user via the input device 94, the transmission control unit 90 determines the direction of torque in the transmission, preferably from the clutch sensors 93, and/or the sensor system 84, which in this case is in the acceleration direction. From this, the transmission control unit 90 determines which element set is loaded and which set is unloaded. The transmission control unit 90 sends a signal to the clutch actuator 92 to reduce the clutch clamp load until the transmission control unit 90 detects relative rotational movement (slip) between the input and output sides of the clutch, preferably via signals received from the clutch sensors 93, and instructs the engine control unit 82 to synchronise the engine speed to the new gear wheel 21 to be selected. The transmission control unit 90 actuates the second actuator 64 and moves the deceleration elements out of engagement with the third gear wheel 17 (see FIG. 6b). The engine control unit 82 adjusts the output of the engine 80 and/or the clutch actuator 92 adjusts the clutch clamp load to ensure that torque in the transmission remains in the acceleration direction during the shift. When the deceleration elements are disengaged the transmission control unit 90 determines whether the conditions are correct to perform the shift, if so it moves the acceleration elements 36 of the second selector mechanism 31 into engagement with the dogs 20 on the fifth gear wheel 21 (see FIG. 6c). If the conditions are not correct the control unit 90 aborts the gearshift.

When the fifth gear wheel 21 is engaged, momentarily drive is transmitted between the input and output shafts 3,1 simultaneously through $2^{nd}$ and $3^{rd}$ gears. The torque spike caused by the engagement is minimised due to the speed synchronisation step. However if a torque spike is generated its effect is mitigated by further relative rotation of the input and output sides of the clutch 86. When the fifth gear wheel 21 is engaged the clamp load between the acceleration elements of the first selector mechanism and the dogs 20 on third gear wheel 17 is sufficiently reduced to enable the first acceleration elements to be disengaged from the third gear wheel 17 by the transmission control unit 90 activating the first actuator 46. The transmission control unit 90 then moves the deceleration elements 35 for the fifth gear wheel 21 into engagement with the fifth gear wheel 21 to fully engage 3rd gear (see FIG. 6d).

The clutch clamp load is reinstated by the clutch actuator 92 and control of the engine 80 is returned to the driver.

Decelerating Upshift

When decelerating in $2^{nd}$ gear, the second element set 36 of the first gear selector mechanism 29 engages the dogs 20 on the third gear wheel 17 and the first element set 35 is unloaded. The first and second sets of engagement elements 35,36 of the second gear selector mechanism 31 are in a neutral position (see FIG. 7a). When a gear change is initiated from the engine control unit 82 or by the user via the input device 94, the transmission control unit 90 determines the direction of torque in the transmission, preferably from the sensor system 84, and/or the clutch sensors 93, which in this case is in the deceleration direction. From this, the transmission control unit 90 determines which elements to move out of engagement from the third gear wheel 17, which is the unloaded acceleration elements in this case. The transmission control unit 90 sends a signal to the clutch actuator 92 to reduce the clutch clamp load until the clutch sensor 93 detects relative rotational movement (slip) between the input and output sides of the clutch 86, and instructs the engine control unit 82 to synchronise the engine speed to the new gear wheel 21 to be selected. The transmission control unit 90 also actuates the first actuator 46 and moves the acceleration elements out of engagement with the third gear wheel 17 (see FIG. 7b). The engine control unit 82 adjusts the output of the engine 80 and/or the clutch actuator 92 adjusts the clutch clamp load to ensure that torque in the transmission remains in the deceleration direction during the shift. When the acceleration elements 35 are disengaged the transmission control unit 90 determines whether the conditions are correct to perform the shift, if so it moves the deceleration elements 35 of the second selector mechanism 31 into engagement with the dogs 20 on the fifth gear wheel 21 (see FIG. 7c). If the conditions are not correct the control unit 90 aborts the gearshift.

When the fifth gear wheel 21 is engaged, momentarily drive is transmitted between the input and output shafts 3,1 simultaneously through $2^{nd}$ and $3^{rd}$ gears. The torque spike caused by the engagement is minimised due to the speed synchronisation step. However if a torque spike is generated its effect is mitigated by further relative rotation of the input and output sides of the clutch 86. When the fifth gear wheel 21 is engaged the clamp load between the deceleration elements 36 of the first selector mechanism 29 and the dogs 20 on third gear wheel 17 is sufficiently reduced to enable them to be disengaged from the third gear wheel 17 by the transmission control unit 90 activating the second actuator 64. The transmission control unit 90 also moves the acceleration elements 36 for the fifth gear wheel 21 into engagement with the fifth gear wheel 21 to fully engage 3rd gear (see FIG. 7d).

The clutch clamp load is reinstated by the clutch actuator 92 and control of the engine 80 is returned to the driver.

Accelerating Downshift (Kick-Down Shift)

When accelerating in 3rd gear, the second element set 36 of the second gear selector mechanism 31 drivingly engages the dogs 20 on the fifth gear wheel 21 and the first element set 35 is unloaded. The first and second sets of engagement elements 35,36 of the first gear selector mechanism 29 are in a neutral position (see FIG. 8a). When a gear change is initiated from the engine control unit 82 or by the user via the input device 94, the transmission control unit 90 determines the direction of torque in the transmission, preferably from the sensor system 84, and 1 or clutch sensors 93, which in this case is in the acceleration direction. From this, the transmission control unit 90 determines which elements to move out of engagement with the third gear wheel 17, which is the unloaded deceleration elements 35 in this case. The clutch actuator 92 adjusts the clutch until the transmission control unit 90 detects relative rotational movement (slip) between the input and output sides of the clutch 86. The transmission control unit 90 also instructs the engine control unit 82 to adjust the engine speed to synchronise it to the new gear speed to maintain substantially the same vehicle speed when the third gear wheel 17 is engaged, adjusting clutch clamp load as necessary. The engine control unit 82 is able to do this since the transmission control unit 90 is programmed with information relating to the gear ratios for each gear train and can determine the currently engaged gear with the position sensors 96 and the new gear to be selected from the inputs received from either the engine control unit 82 or the input device 94. Synchronising the engine speed in this manner has a smoothing effect when engaging the new gear and prevents the vehicle from lurching when the gear is selected. The transmission control unit 90 activates the second actuator 64 and moves the deceleration elements out of engagement with the fifth gear wheel 21 (see FIG. 8b). When the deceleration elements are disengaged the transmission control unit 90 determines whether the conditions are correct to perform the shift, if so it moves the acceleration elements of the first selector mechanism 29 into engagement with the dogs 20 on the third gear wheel 17 (see FIG. 8c). If the conditions are not correct the transmission control unit 90 aborts the gearshift.

When the third gear wheel 17 is engaged momentarily drive is transmitted between the input and output shafts 3,1 simultaneously through $2^{nd}$ and $3^{rd}$ gears. The engine control unit 82 adjusts the output of the engine 80 and/or the clutch actuator 92 adjusts the clutch clamp load to ensure that torque in the transmission remains in the acceleration direction during the shift. The transmission control unit 90 activates the second actuator 64 and the acceleration elements 36 are moved out of engagement from the fifth gear wheel 21. The transmission control unit 90 also moves the deceleration elements 36 for the third gear wheel 17 into engagement with the third gear wheel 17 to fully engage 2nd gear (see FIG. 8d).

The engine control unit 82 makes any necessary adjustments to the engine output and then returns control of the engine to the driver. The clutch actuator 92 fully restores the clutch clamp load.

Decelerating Downshifts

When decelerating in $3^{rd}$ gear, the first element set 35 of the second gear selector mechanism 31 is engaged with the dogs 20 on the fifth gear wheel 17 and the second element set 36 is unloaded. The first and second sets of engagement elements 35,36 of the first gear selector mechanism 29 are in a neutral position (see FIG. 9a). When a gear change is initiated from the engine control unit 82 or by the user via the input device 94, the transmission control unit 90 determines the direction of torque in the transmission, preferably from the sensor system 84, and/or the clutch sensors 93, which in this case is in the deceleration direction. From this, the transmission control unit 90 determines which elements to move out of engagement from the fifth gear wheel 21, which is the unloaded acceleration elements 36 in this case. The transmission control unit 90 sends a signal to the clutch actuator 92 to reduce the clutch clamp load until the control unit 90 detects relative rotational movement (slip) between the input and output sides of the clutch, and instructs the engine control unit 82 to synchronise the engine speed to the new gear wheel to be selected. The transmission control unit 90 actuates the second actuator 64 and moves the acceleration elements 36 out of engagement from the fifth gear wheel 21 (see FIG. 9b) and instructs the engine control unit 82 to adjust the output of the engine 80 and/or the clutch actuator 92 to adjust the clutch clamp load to ensure that torque in the transmission remains in the deceleration direction during the shift. When the acceleration elements 35 are disengaged the transmission control unit 90 determines whether the conditions are correct to perform the shift, if so it moves the deceleration elements 36 of the first selector mechanism 29 into engagement with the dogs 20 on the third gear wheel 17 (see FIG. 9c). If the conditions are not correct the control unit 90 aborts the gearshift.

When the third gear wheel 17 is engaged, momentarily drive is transmitted between the input and output shafts 3,1 simultaneously through $2^{nd}$ and $3^{rd}$ gears. The torque spike caused by the engagement is minimised due to the speed synchronisation step. However if a torque spike is generated its effect is mitigated by further relative rotation of the input and output sides of the clutch 86. When the third gear wheel 17 is engaged the clamp load between the deceleration elements 35 of the second selector mechanism 31 and the dogs 20 on fifth gear wheel 21 is sufficiently reduced to enable them to be disengaged from the fifth gear wheel 21 by the transmission control unit 90 activating the first actuator 46. The transmission control unit 90 also moves the acceleration elements 35 for the third gear wheel 17 into engagement with the third gear wheel 17 to fully engage 2nd gear (see FIG. 9d).

The clutch clamp load is reinstated by the clutch actuator 92 and control of the engine 80 is returned to the driver.

Modifications can be made to the above embodiment that are within the scope of the invention. For example, the above arrangement can be repeated for any number of selector mechanisms mounted on the input shaft 3. Also, the selector assemblies and rotatably mounted gear wheels can be mounted on the output shaft, and the fixed gear wheels on the input shaft.

The transmission system can be used in any vehicle for example, road cars, racing cars, lorries, motorcycles, bicycles, trains, trams, coaches, earth removal vehicles such as bulldozers and diggers, cranes, water craft such as hovercraft and ships, aircraft including aeroplanes and helicopters, and military vehicles. The system can also be used in any machine that has first and second rotatable bodies wherein drive is to be transmitted from one of the rotatable bodies to the other with variable speed and torque characteristics, such as transportation systems and manufacturing equipment including lathes, milling machines and dedicated production systems.

Use of instantaneous type gear selector mechanism leads to improved performance, lower fuel consumption and lower emissions since drive interruption during gear changes is substantially eliminated. Also the system is a more compact design than conventional gearboxes leading to a reduction in gearbox weight.

The invention claimed is:

1. A transmission system including a first shaft, a first gear element rotatably mounted on the first shaft, a first gear selector assembly including first and second sets of engagement members, arranged to selectively lock the first gear wheel for rotation with the first shaft, said selection being from operational modes that include: lock the first gear element for rotation with the first shaft in the clockwise and anti-clockwise directions; lock the first gear element for rotation with the first shaft in the clockwise direction and not lock in the anti-clockwise direction; lock the first gear element for rotation with the first shaft in the anti-clockwise direction and not lock in the clockwise direction; and further including an actuator system for selecting between the operational modes having a first actuator member for moving the first set of engagement members, a second actuator member for moving the second set of engagement members, a first actuator device for actuating the first actuator member and a second actuator device for actuating the second actuator member independently of the first actuator device.

2. A transmission system according to claim 1, wherein at least one of the first and second actuator devices is electronically controllable.

3. A transmission system according to claim 1, wherein at least one of the first and second actuator devices is either electrically driven, mechanically driven, pneumatically driven or hydraulically driven.

4. A transmission system according to claim 1, wherein at least one of the first and second actuator members is slidably mounted on a support and at least one of the first and second device devices is arranged to drive its respective actuator member along the support bi-directionally.

5. A transmission system according to claim 1, wherein the actuator system includes resilient means for biasing the first and/or second set of engagement members in an axial direction.

6. A transmission system according to claim 1, wherein the first gear selector assembly can select the following operational mode: not lock the gear element for rotation with the first shaft in the clockwise or anticlockwise directions.

7. A transmission system according to claim 1, including a second gear element rotatably mounted on the first shaft and a second gear selector assembly for selectively locking the second gear element for rotation with the first shaft, wherein the second gear selector assembly is arranged to lock the second gear element for rotation with the first shaft, said selection being from operational modes that include: lock the second gear element for rotation with the first shaft in the clockwise and anti-clockwise directions; lock the second gear element for rotation with the first shaft in the clockwise direction and not lock in the anti-clockwise direction; lock the second gear element for rotation with the first shaft in the anti-clockwise direction and not lock in the clockwise direction.

8. A transmission system according to claim 7, wherein the second gear selector assembly is arranged such that when a driving force is transmitted, one of the first and second sets of engagement members drivingly engages an engaged gear element, and the other set of engagement members is then in an unloaded condition.

9. A transmission according claim 7, wherein the second gear selector assembly is arranged such that when a decelerating force is transmitted the first set of engagement members engages an engaged gear element, and the second set of engagement members is in an unloaded condition, and when a driving force is transmitted the second set of engagement members drivingly engages the engaged gear element, and the first set of engagement members is then in an unloaded condition.

10. A transmission system according to claim 7, wherein the second gear selector assembly can select the following operational mode: not lock the second gear element for rotation with the first shaft in the clockwise or anticlockwise directions.

11. A transmission system according to claim 7 or 10, wherein the second gear selector assembly includes first and second sets of engagement members arranged to selectively lock the second gear element for rotation with the first shaft and an actuator system for selecting between the operational modes having a first actuator member for moving the first set of engagement members, a second actuator member for moving the second set of engagement members, a first actuator device for actuating the first actuator member and a second actuator device for actuating the second actuator member independently of the first actuator device.

12. A transmission system according to claim 1, wherein the first gear selector assembly is arranged such that when a driving force is transmitted, one of the first and second sets of engagement members drivingly engages an engaged gear element, and the other set of engagement members is then in an unloaded condition.

13. A transmission according to claim 1, wherein the first gear selector assembly is arranged such that when a decelerating force is transmitted the first set of engagement members engages an engaged gear element, and the second set of engagement members is in an unloaded condition, and when a driving force is transmitted the second set of engagement members drivingly engages the engaged gear element, and the first set of engagement members is then in an unloaded condition.

14. A transmission according to claim 1, wherein the actuator system is arranged to bias a loaded set of engagement members towards an unengaged gear element without disengaging the loaded set of engagement members from an engaged gear element.

15. A transmission system according to claim 7, including an electronically programmable control system for controlling operation of the first and second gear selector assemblies, wherein the control system is arranged to move an unloaded set of engagement members included in one of the first and second gear selector assemblies out of engagement from an engaged gear element before actuating the other gear selector assembly to engage a new gear element.

16. A transmission system according to claim 15, wherein the control system is arranged to bias a loaded set of engagement members towards the new gear element until the loaded set of engagement members is free to move.

17. A transmission system according to claim 1, further including a system for determining the direction of torque in the transmission system when receiving a request for a gearshift.

18. A transmission system according to claim 1, further including a system for preventing the direction of torque in the transmission changing during a gearshift.

19. A transmission system according to claim 18, wherein the system is arranged to issue control signals to adjust an output of a drive source and/or the system is arranged to issue control signals for controlling a clamp load between input and output sides of a clutch device.

20. A transmission system according to claim 1, further including a system for performing a checking routine before undertaking a gearshift to determine whether the conditions for making the shift are suitable and to abort the gearshift in the event that conditions are not suitable.

21. A transmission system according to claim 1, further including a system for determining which gear(s) is/are engaged.

22. A transmission system according to claim 21, wherein the system is arranged to determine which gear element(s) is/are engaged from the output of a system for detecting the positions of the first and second sets of engagement members.

23. A transmission system including first and second rotatable shafts, and means for transferring drive from one of the shafts to the other shaft including first and second gear elements each rotatably mounted on the first shaft and having drive formations formed thereon, a gear selector assembly for selectively transmitting torque between the first shaft and the first gear element and between the first shaft and the second gear element, said selector assembly including first and second sets of engagement members that are moveable into and out of engagement from the first and second gear elements and an actuator system, wherein the gear selector assembly is arranged such that when a driving force is transmitted, one of the first and second sets of engagement members drivingly engages the engaged gear element, and the other set of engagement members is then in an unloaded condition, and the actuator system includes a first actuator member for moving the first set of engagement members, a second actuator member for moving the second set of engagement members, a first actuator device for actuating the first actuator member and a second actuator device for actuating the second actuator member independently of the first actuator device, and wherein the actuator system is arranged to move the unloaded set of engagement members into driving engagement with the unengaged gear element to effect a gear change.

24. A method for performing a gearshift in a transmission system having first and second gear elements rotatably mounted on a first shaft, a first gear selector assembly for selectively locking the first gear element for rotation with the first shaft and a second gear selector assembly for selectively locking the second gear element for rotation with the first shaft, wherein each gear selector assembly includes first and second sets of engagement members and an actuator system for actuating the first and second sets of engagement members for locking its respective gear element for rotation with the first shaft, said selection being from operational modes that include: lock the gear element for rotation with the first shaft in an acceleration and a deceleration directions; lock the gear element for rotation with the first shaft in the acceleration direction and not lock in the deceleration direction; lock the gear element for rotation with the first shaft in the deceleration direction and not lock in the acceleration direction, and a control system for controlling operation of the transmission system, including disengaging an unloaded set of engagement members from a currently engaged gear element prior to selecting a new gear element with the other gear selector assembly.

25. A method according to claim 24, including, when starting from a position wherein the first gear element is locked for rotation with the first shaft in the acceleration and deceleration directions and one of the first and second sets of engagement members drivingly engages the first gear element and the other set of engagement members is in an unloaded condition, disengaging the unloaded set of engagement members from the first gear element and selecting the second gear element with the corresponding set of engagement members.

26. A method according to claim 25, including, when performing an accelerating upshift, one of the first and second sets of engagement members comprises a deceleration engagement member set, moving the deceleration engagement member set out of engagement from the first gear element before the second gear selector assembly engages the second gear element with its acceleration engagement member set.

27. A method according to claim 25, including, when performing a decelerating upshift, one of the first and second sets of engagement members comprises an acceleration engagement member set, moving the acceleration engagement member set out of engagement from the first gear element before the second gear selector assembly engages the second gear element with its deceleration engagement member set.

28. A method according to claim 24, including, when starting from a position wherein the second gear element is locked for rotation with the first shaft in the acceleration and deceleration directions, one of the first and second sets of engagement members drivingly engages the second gear element and the other set of engagement members is in an unloaded condition, disengaging the unloaded set of engagement members from the second gear element and selecting the first gear element with the other gear selector assembly.

29. A method according to claim 28, including, when performing an accelerating downshift, one of the first and second sets of engagement members comprises a deceleration engagement member set, moving the deceleration engagement member set out of engagement from the second gear element before the first gear selector assembly engages the first gear element with its acceleration engagement member set.

30. A method according to claim 28, including, when performing a decelerating downshift, one of the first and second sets of engagement members comprises an acceleration engagement member set, moving the acceleration engagement member set out of engagement from the second gear element before the first gear selector assembly engages the first gear element with its deceleration engagement member set.

31. A method according to claim 24, including determining the direction of torque in the transmission in order to identify which set of engagement members to move out of engagement from the currently engaged gear element.

32. A method according to claim 31, including measuring at least one transmission parameter and a control system determining the direction of torque in the transmission from the measured parameter.

33. A method according to claim 32, including monitoring the rotational speed of at least one transmission component and determining the direction of torque by calculating a rate of change of rotational speed.

34. A method according to claim 24, including determining which gear is currently engaged.

35. A method according to claim 34, including determining positions of each of the first and second sets of engagement members for each selector assembly in order to determine which gear is currently engaged.

36. A method according to claim 24, including reducing a clutch clamp load in a clutch device until there is relative movement between input and output sides of the clutch device before engaging the new gear element.

37. A method according to claim 36, including determining whether there is relative movement between the input and output sides of the clutch device by monitoring the rotational speeds of the input and/or output sides of the clutch device.

38. A method according to claim 37, further including adjusting the clutch clamp load between the input and output sides of the clutch device in order to maintain a slip condition.

39. A method according to claim 24, further including adjusting a drive source speed to synchronise it with a new gear speed before engaging the new gear element.

40. A method according to claim 24, including adjusting the torque applied to the transmission to ensure that torque in the transmission system does not change direction during a gearshift.

41. A method according to claim 40, including adjusting a drive source speed and/or a clutch clamp load in order to ensure that torque in the transmission system does not change direction during a gearshift.

42. A method according to claim 36, including reinstating the clutch clamp load and returning control of an engine to a user after the gearshift has been completed.

43. A method according to claim 24, including performing a checking routine in order to determine whether the gearshift can be made without the transmission locking up and aborting the gearshift if the checking routine indicates that it is not safe to perform the gearshift.

44. A method according to claim 24, wherein the actuator system for each gear selector mechanism includes a first actuator for actuating the first set of engagement members and a second actuator for actuating the second set of engagement members independently of the first set.

45. A method according to claim 24, including measuring a rotational speed of a transmission output member.

* * * * *

UNITED STATES PATENT AND TRADEMARK OFFICE
CERTIFICATE OF CORRECTION

PATENT NO. : 8,171,814 B2
APPLICATION NO. : 12/300318
DATED : May 8, 2012
INVENTOR(S) : Martin et al.

It is certified that error appears in the above-identified patent and that said Letters Patent is hereby corrected as shown below:

At column 6, line 50, after "been" please delete "to".

At column 10, line 40, after "first" please delete "to".

At column 10, line 48, after "Preferably this" please delete "z)".

At column 11, line 20, after "initiating the" please delete "to".

At column 25, line 56, please change "and 1 or" to "and/or".

At column 28, line 11, in claim 4, change "device" to "actuator".

Signed and Sealed this
Eleventh Day of December, 2012

David J. Kappos
*Director of the United States Patent and Trademark Office*